(12) United States Patent
Lin et al.

(10) Patent No.: US 12,101,113 B2
(45) Date of Patent: Sep. 24, 2024

(54) RADIO FREQUENCY MODULE, CONTROL METHOD, AND ELECTRONIC DEVICE

(71) Applicant: GUANGDONG OPPO MOBILE TELECOMMUNICATIONS CORP., LTD., Guangdong (CN)

(72) Inventors: Po-Wei Lin, Guangdong (CN); Yiling Jiang, Guangdong (CN); Zhenchang Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 187 days.

(21) Appl. No.: 17/809,426

(22) Filed: Jun. 28, 2022

(65) Prior Publication Data
US 2022/0329280 A1    Oct. 13, 2022

Related U.S. Application Data

(63) Continuation of application No. PCT/CN2020/139380, filed on Dec. 25, 2020.

(30) Foreign Application Priority Data

Jun. 5, 2020    (CN) .......................... 202010507523.0

(51) Int. Cl.
*H04B 1/54*    (2006.01)
*H04B 1/00*    (2006.01)
(Continued)

(52) U.S. Cl.
CPC ............. *H04B 1/54* (2013.01); *H04B 1/0064* (2013.01); *H04B 1/40* (2013.01); *H04B 7/04* (2013.01)

(58) Field of Classification Search
CPC .... H04B 1/005; H04B 1/0064; H04B 1/0067; H04B 1/0075; H04B 1/38; H04B 1/40;
(Continued)

(56) References Cited

U.S. PATENT DOCUMENTS 10,158,163 B2    12/2018 Gang et al.
2013/0028148 A1    1/2013 Heo et al.
(Continued)

FOREIGN PATENT DOCUMENTS

CN    102479991    5/2012
CN    202309698    7/2012
(Continued)

OTHER PUBLICATIONS

USPTO, Office Action for U.S. Appl. No. 17/136,412, Aug. 23, 2022.
(Continued)

*Primary Examiner* — Young T. Tse
(74) *Attorney, Agent, or Firm* — Hodgson Russ LLP

(57) ABSTRACT

A radio frequency (RF) module includes a RF transceiver module, a first antenna, a second antenna, a first duplexer, and a second duplexer. The RF transceiver module is configured for RF signal reception and transmission. The first antenna is configured to transmit a first transmit (Tx) signal and receive a first primary receive (PRx) signal. A first end of the first duplexer is coupled with the RF transceiver module, and a second end of the first duplexer is coupled with the first antenna. The second antenna is configured to transmit a second Tx signal and receive a second PRx signal. A first end of the second duplexer is coupled with the RF transceiver module, and a second end of the second duplexer is coupled with the second antenna. A control method, an electronic device, and a storage medium are further disclosed by the present disclosure.

13 Claims, 12 Drawing Sheets

(51) Int. Cl.
*H04B 1/40* (2015.01)
*H04B 7/04* (2017.01)

(58) Field of Classification Search
CPC ... H04B 1/44; H04B 1/50; H04B 1/54; H04B 7/04; H04B 7/0404; H04B 7/0491; H04B 7/14
USPC ....... 375/219, 220, 222, 259, 260, 262, 265, 375/267; 370/278, 281, 282, 295, 334; 455/500, 84, 88
See application file for complete search history.

(56) References Cited

U.S. PATENT DOCUMENTS

| | | | |
|---|---|---|---|
| 2014/0003300 | A1 | 1/2014 | Weissman et al. |
| 2015/0109977 | A1 | 4/2015 | Loh |
| 2015/0110229 | A1 | 4/2015 | Kim |
| 2017/0054199 | A1 | 2/2017 | Gang et al. |
| 2017/0365914 | A1 | 12/2017 | Hong et al. |
| 2017/0373730 | A1 | 12/2017 | Pehlke et al. |
| 2018/0278275 | A1 | 9/2018 | Leung |
| 2018/0294858 | A1 | 10/2018 | Pehlke |
| 2018/0367168 | A1 | 12/2018 | Lee et al. |
| 2019/0190583 | A1 | 6/2019 | Natarajan et al. |
| 2020/0186400 | A1 | 6/2020 | Lee et al. |
| 2021/0194515 | A1 | 6/2021 | Go et al. |
| 2021/0203368 | A1* | 7/2021 | Chen .................... H04B 1/0064 |
| 2021/0226672 | A1 | 7/2021 | Cho et al. |

FOREIGN PATENT DOCUMENTS

| | | |
|---|---|---|
| CN | 104980200 | 10/2015 |
| CN | 105281819 | 1/2016 |
| CN | 105306112 | 2/2016 |
| CN | 105553505 | 5/2016 |
| CN | 105656610 | 6/2016 |
| CN | 106252845 | 12/2016 |
| CN | 106656248 | 5/2017 |
| CN | 106921405 | 7/2017 |
| CN | 106981724 | 7/2017 |
| CN | 107005264 | 8/2017 |
| CN | 107124191 | 9/2017 |
| CN | 107124212 | 9/2017 |
| CN | 107465445 | 12/2017 |
| CN | 107769814 | 3/2018 |
| CN | 107834162 | 3/2018 |
| CN | 108054163 | 5/2018 |
| CN | 108461891 | 8/2018 |
| CN | 207800900 | 8/2018 |
| CN | 108493577 | 9/2018 |
| CN | 108605279 A | 9/2018 |
| CN | 108718206 | 10/2018 |
| CN | 108809760 A | 11/2018 |
| CN | 109004947 | 12/2018 |
| CN | 208539894 | 2/2019 |
| CN | 109474284 | 3/2019 |
| CN | 109547054 | 3/2019 |
| CN | 109672455 | 4/2019 |
| CN | 109743072 | 5/2019 |
| CN | 110086481 | 8/2019 |
| CN | 110140326 A | 8/2019 |
| CN | 110166073 | 8/2019 |
| CN | 110190860 | 8/2019 |
| CN | 110267255 | 9/2019 |
| CN | 107453766 | 11/2019 |
| CN | 110518932 | 11/2019 |
| CN | 110572178 | 12/2019 |
| CN | 209805818 | 12/2019 |
| CN | 209860135 | 12/2019 |
| CN | 110380771 | 4/2023 |
| JP | 2003298471 | 10/2003 |
| WO | WO-2021136087 A1 * | 7/2021 ............... H01Q 1/50 |

OTHER PUBLICATIONS

CNIPA, Third Office Action for CN Application No. 202011581686.X, Jul. 19, 2022.
CNIPA, First Office Action for CN Application No. 202010507523.0, Feb. 5, 2021.
CNIPA, Notification to Grant Patent Right for Invention for CN Application No. 202010507523.0, Jun. 21, 2021.
CNIPA, First Office Action for CN Application No. 202011581686.X, Nov. 17, 2021.
CNIPA, First Office Action for CN Application No. 202011582504.0, Oct. 11, 2021.
Hikita et al., "RF-circuit configurations and new SAW duplexers for single- and dual-band cellular radios," IEEE MTT-S International Microwave Symposium Digest, 1999.
Hu et al., "Initial Analysis of RF Front-end Design for Mobile Phone," Monthly Focus, Sep. 2017.
CNIPA, Notification to Grant Patent Right for Invention for CN Application No. 202011582504.0, Mar. 11, 2022.
CNIPA, First Office Action for CN Application No. 202011307863.5, Jun. 28, 2021.
CNIPA, Second Office Action for CN Application No. 202011307863.5, Dec. 3, 2021.
CNIPA, First Office Action for CN Application No. 202011481537.6, Nov. 23, 2021.
EPO, Extended European Search Report for EP Application No. 20215086.8, May 18, 2021.
USPTO, Ex Parte Quayle Action for U.S. Appl. No. 17/136,412, Feb. 3, 2022.
WIPO, International Search Report and Written Opinion for International Application No. PCT/CN2020/138774, Mar. 23, 2021.
WIPO, International Search Report and Written Opinion for International Application No. PCT/CN2020/139380, Mar. 24, 2021.
CNIPA, Second Office Action for CN Application No. 202011481537.6, May 11, 2022.
CNIPA, Second Office Action for CN Application No. 202011581686.X, Apr. 14, 2022.
USPTO, Non-Final Office Action for U.S. Appl. No. 17/136,412, Apr. 18, 2022.
CNIPA, Office Action for CN Application No. 202011481537.6, Oct. 27, 2022.
USPTO, Office Action for U.S. Appl. No. 17/136,412, Dec. 8, 2022.
CNIPA, Office Action for CN Application No. 202011581686.X, Jan. 9, 2023.
CNIPA, First Office Action for CN Application No. 202080073327.5, Feb. 14, 2023.
EPO, Communication for EP Application No. 20215086.8, Mar. 21, 2023.
EPO, Extended European Search Report for EP Application No. 20908689.1, May 15, 2023.
CNIPA, Second Office Action for CN Application No. 202080073327.5, Jul. 27, 2023.
CNIPA, Third Office Action for CN Application No. 202080073327.5, Jan. 12, 2024.
CNIPA, Notice of Reexamination for CN Application No. 202011581686.X, Mar. 6, 2024.
CNIPA, Notification to Grant Patent Right for Invention for CN Application No. 202080073327.5, Apr. 1, 2024.
CNIPA, Review Decision Letter for CN Application No. 202011581686.X, Apr. 29, 2024.

* cited by examiner

RADIO FREQUENCY MODULE, CONTROL METHOD, AND ELECTRONIC DEVICE

CROSS-REFERENCE TO RELATED APPLICATIONS

This application is a continuation of International Application No. PCT/CN2020/139380, filed Dec. 25, 2020, which claims priority to Chinese Patent Application No. 202010507523.0, filed Jun. 5, 2020. The entire disclosures of the aforementioned applications are incorporated herein by reference.

TECHNICAL FIELD

This disclosure relates to the technical field of antennas, and in particular to a radio frequency (RF) module, a control method, an electronic device, and a storage medium.

BACKGROUND

With development and progress of technology, fifth-generation (5G) communication technology has gradually begun to be applied. 5G mobile networks include standalone (SA) and non-standalone (NSA) modes, where the SA mode is relatively high in costs. In order to save costs, the NSA mode is currently mainly used. In the NSA mode, a fourth-generation (4G) and 5G dual-connectivity mode is usually adopted. Therefore, for mobile communication electronic devices, it is urgent to realize communication in the 4G and 5G dual-connectivity mode.

It should be noted that the information disclosed in the above background art section is only used to enhance understanding of the background of the present disclosure, therefore, the information may include information that does not constitute the related art known to those of ordinary skill in the art.

SUMMARY

According to one aspect of the present disclosure, a RF module is provided, and the RF module includes a RF transceiver module, a first antenna, a first duplexer, a second antenna, and a second duplexer. The RF transceiver module is configured for RF signal reception and transmission. The first antenna is configured to transmit a first transmit (Tx) signal and receive a first primary receive (PRx) signal. A first end of the first duplexer is coupled with the RF transceiver module, a second end of the first duplexer is coupled with the first antenna, and the first duplexer is configured to isolate the first Tx signal and the first PRx signal. The second antenna is configured to transmit a second Tx signal and receive a second PRx signal, where an operating frequency band of the first antenna is different from an operating frequency band of the second antenna. A first end of the second duplexer is coupled with the RF transceiver module, a second end of the second duplexer is coupled with the second antenna, and the second duplexer is configured to isolate the second Tx signal and the second PRx signal.

According to another aspect of the present disclosure, a control method is provided and applicable to an electronic device. The electronic device includes a frame and the above RF module. The control method includes the following. The RF transceiver module is controlled to generate the RF signal. Whether a communication signal strength of the first antenna is greater than a communication signal strength of the second antenna is determined. When the communication signal strength of the first antenna is greater than the communication signal strength of the second antenna, the first antenna and the third antenna are controlled to transmit the RF signal. When the communication signal strength of the first antenna is less than or equal to the communication signal strength of the second antenna, the second antenna and the third antenna are controlled to transmit the RF signal.

According to yet another aspect of the present disclosure, an electronic device is provided, and the electronic device includes the above RF module.

It should be understood that the above general description and the following detailed description are merely exemplary and explanatory, and cannot limit the present disclosure.

BRIEF DESCRIPTION OF THE DRAWINGS

The accompanying drawings here are incorporated into the specification and constitute a part of the specification, show implementations in accordance with the present disclosure, and are used to explain the principles of the disclosure together with the specification. Obviously, the accompanying drawings described below are merely some implementations of the disclosure. For a person ordinarily skilled in the art, other accompanying drawings can also be obtained in light of these accompanying drawings, without paying inventive effort.

Figure 1:
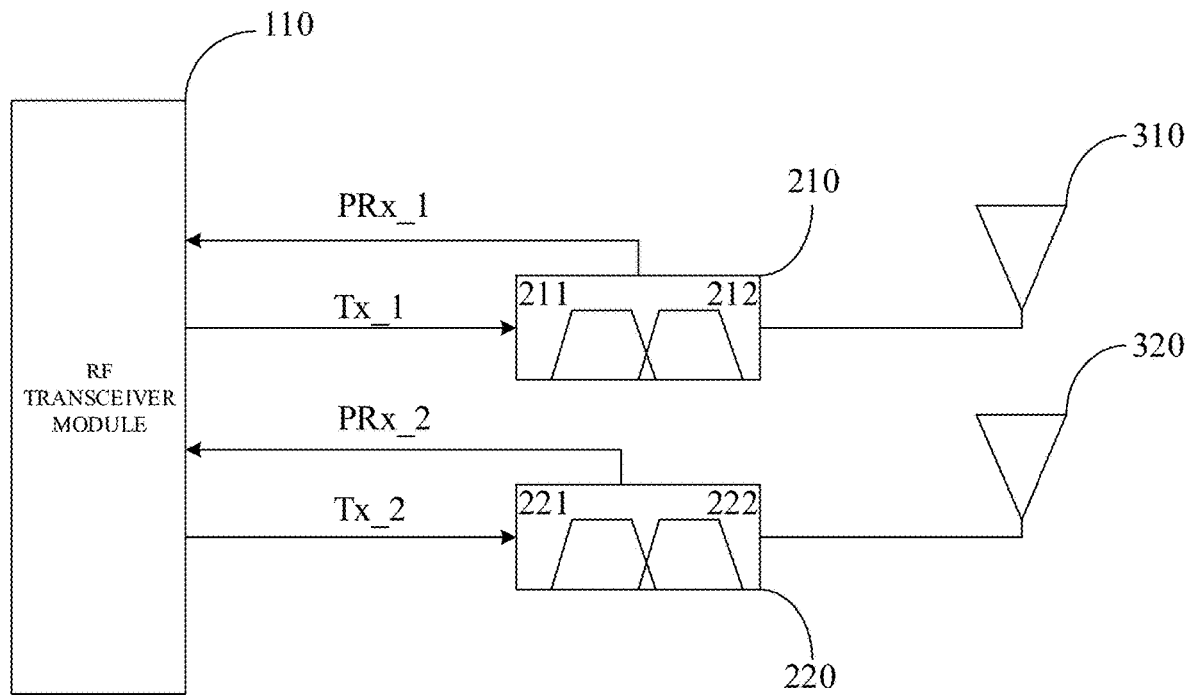
FIG. 1 is a schematic view of a radio frequency (RF) module provided by exemplary implementations of the present disclosure.

In the drawings: 110, RF transceiver module; 120, signal control switch; 121, first signal control sub-switch; 122, second signal control sub-switch; 210, first duplexer; 220, second duplexer; 230, filter c; 240, filter b; 250, filter a; 310, antenna a; 320, antenna b; 330, antenna e; 340, antenna d; 350, antenna c; 410, first amplification circuit; 420, second amplification circuit; 430, third amplification circuit; 100, electronic device; 10, display screen; 11, display region; 12, non-display region; 20, frame; 21, bottom wall; 22, first side wall; 23, second side wall; 30, mainboard; 40, battery; 50, rear cover; 211, first end of first duplexer; 212, second end of first duplexer; 2111, first sub-end of first duplexer; 2112, second sub-end of first duplexer; 221, first end of second duplexer; 222, second end of second duplexer; 2211, first sub-end of second duplexer; 2212, second sub-end of second duplexer; 411, first end of first amplification; 412, second end of second amplification; 421, first end of second amplification; 422, second end of second amplification; 41, memory; 42, program; 60, computer-readable storage medium.

DETAILED DESCRIPTION

Exemplary implementations will be described more comprehensively with reference to the accompanying drawings. However, exemplary implementations can be implemented in various forms, and should not be construed as being limited to the implementations set forth herein. On the contrary, these implementations are provided to make the present disclosure more comprehensive and complete, and comprehensively delivery the idea of the exemplary implementations to those skilled in the art. The same reference signs in the drawings represent the same or similar structures, and thus their detailed descriptions will be omitted.

Electronic devices realize wireless communication through radio frequency (RF) modules. With development of fifth-generation (5G) technology, electronic devices are required to realize fourth-generation (4G) communication and 5G communication simultaneously. In other words, a RF module of an electronic device need to have both a function of 4G communication signal transceiving and a function of 5G communication signal transceiving.

In implementations of the present disclosure, a RF module is first provided. The RF module can be applicable to an electronic device, such as a mobile phone, a tablet computer, an electronic reader, a smart television, a wearable terminal, an on-board computer, etc. Reference can be made to FIG. 1, and the electronic device includes a RF transceiver module 110, an antenna a 310, an antenna b 320, a first duplexer 210, and a second duplexer 220. The RF transceiver module 110 is configured for RF signal reception and transmission. The antenna a 310 is configured to transmit a first transmit (Tx) signal (Tx_1) and receive a first primary receive (PRx) signal (PRx_1). A first end 211 of the first duplexer 210 is coupled with the RF transceiver module 110, a second end 212 of the first duplexer 210 is coupled with the antenna a 310, and the first duplexer 210 is configured to isolate the first Tx signal and the first PRx signal. The antenna b 320 is configured to transmit a second Tx signal (Tx_2) and receive a second PRx signal (PRx_2). A first end 221 of the second duplexer 220 is coupled with the RF transceiver module 110, a second end 222 of the second duplexer 220 is coupled with the antenna b 320, and the second duplexer 220 is configured to isolate the second Tx signal and the second PRx signal.

In the RF module provided by the implementations of the present disclosure, the antenna a 310 transmits the first Tx signal and receives the first PRx signal, the first duplexer 210 isolates the first Tx signal and the first PRx signal, the antenna b 320 transmits the second Tx signal and receives the second PRx signal, and the second duplexer 220 isolates the second Tx signal and the second PRx signal, where the antenna a 310 can be used for 4G communication, and the antenna b 320 can be used for 5G communication. Therefore, the electronic device can realize communication in dual connectivity of 4G and 5G in a non-standalone (NSA) mode, and is simple in structure and easy to be implemented.

Figure 3:
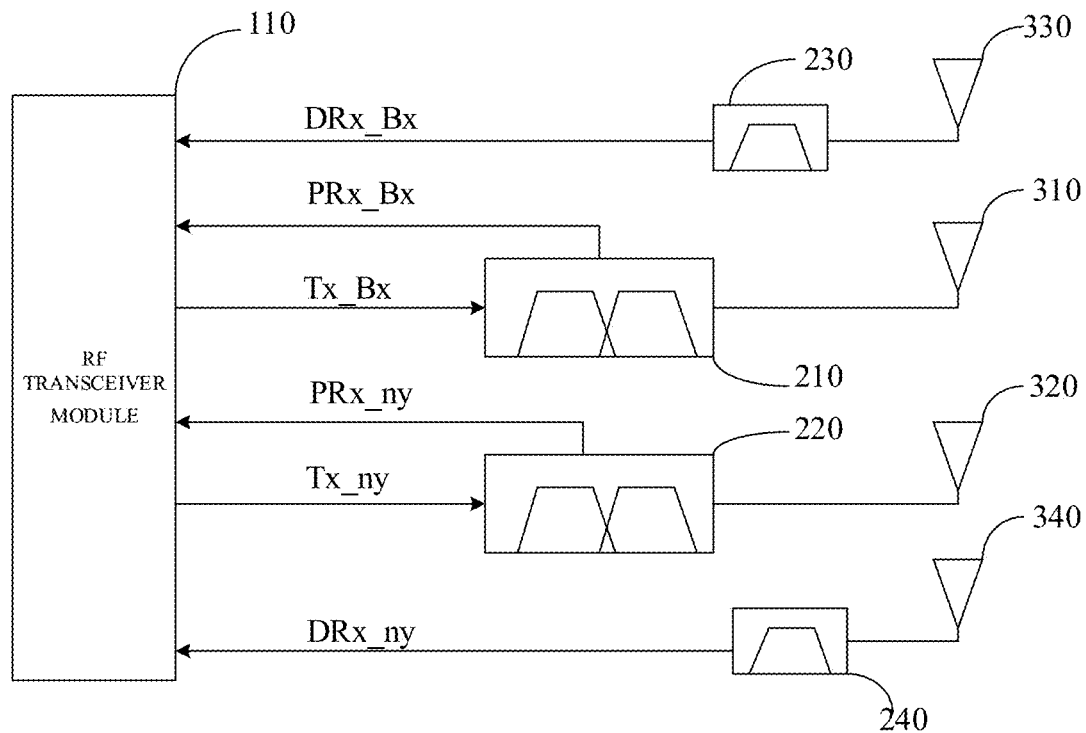
FIG. 3 is a schematic view of a RF module provided by other exemplary implementations of the present disclosure.

In a possible implementation, reference can be made to FIG. 3, and the RF module provided by the implementations of the present disclosure can further includes an antenna e 330, a filter c 230, an antenna d 340, and a filter b 240. In this implementation, the antenna e 330, the filter c 230, the antenna d 340, and the filter b 240 can also be interpreted as the fourth antenna 330, the second filter 230, the third antenna 340, and the first filter 240. The antenna e 330 is configured to receive a first diversity receive (DRx) signal. The filter c 230 is coupled with the antenna e 330 and the RF transceiver module 110 respectively, and the filter c 230 is configured to filter the first DRx signal. The antenna d 340 is configured to receive a second DRx signal. The filter b 240 is coupled with the antenna d 340 and the RF transceiver module 110 respectively, and the filter b 240 is configured to filter the second DRx signal.

The first PRx signal and the first DRx signal are received downlink signals according to a first Tx signal of an uplink signal in a first operating frequency band. The second PRx signal and the second DRx signal are received downlink signals according to a second Tx signal of an uplink signal in a second operating frequency band.

Figure 2:
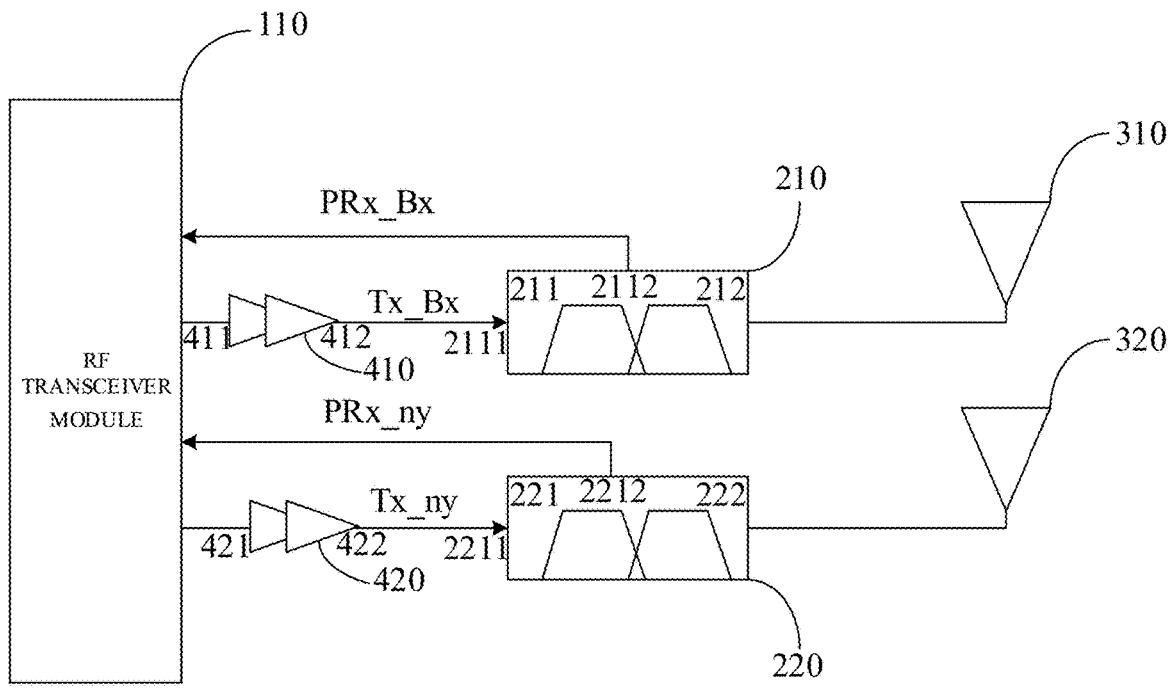
FIG. 2 is a schematic view of a RF module provided by other exemplary implementations of the present disclosure.

Reference can be made to FIG. 2, the first end 211 of the first duplexer 210 includes a first sub-end 2111 and a second sub-end 2112, the first sub-end 2111 is coupled with the RF transceiver module 110 to transmit the first Tx signal, and the second sub-end 2112 is coupled with the RF transceiver module 110 to transmit the first PRx signal.

On this basis, the RF module can further include a first amplification circuit 410, a first end 411 of the first amplification circuit 410 is coupled with the RF transceiver module 110, a second end 412 of the first amplification circuit 410 is coupled with the first sub-end 2111 of the first duplexer 210, and the first amplification circuit 410 is configured to amplify the first Tx signal. The first amplification circuit 410 can include a power amplifier.

The first end 221 of the second duplexer 220 includes a first sub-end 2211 and a second sub-end 2212, the first sub-end 2211 is coupled with the RF transceiver module 110 to transmit the second Tx signal, and the second sub-end 2212 is coupled with the RF transceiver module 110 to transmit the second PRx signal.

On this basis, the RF module can further include a second amplification circuit 420, a first end 421 of the second amplification circuit 420 is coupled with the RF transceiver module 110, a second end 422 of the second amplification circuit 420 is coupled with the first sub-end 2211 of the second duplexer 220, and the second amplification circuit 420 is configured to amplify the second Tx signal. The second amplification circuit 420 can include a power amplifier.

The RF module provided by the implementations of the present disclosure may be a frequency-division duplex (FDD) RF module, that is, various paths of signals have different uplink frequency bands and downlink frequency bands, therefore, the first Tx signal and the first PRx signal can be isolated by the first duplexer 210 and the second Tx signal and the second PRx signal can be isolated by the second duplexer 220.

A first Tx signal (Tx_Bx) may be a long term evolution (LTE) low frequency signal, a second Tx signal (Tx_ny) may be a 5G new radio (NR) low frequency signal. Correspondingly, a first PRx signal (PRx_Bx) and a first DRx signal (DRx_Bx) may be LTE low frequency signals, and a second PRx signal (PRx_ny) and a second DRx signal (DRx_ny) may be 5G NR low frequency signals. In other words, the antenna a 310 is a 4G antenna, and the antenna b 320 is a 5G antenna.

Exemplarily, a frequency band of the first Tx signal is B20, and a frequency band of the second Tx signal is n28a. An operating frequency band of the antenna a 310 is B20, and an operating frequency band of the antenna b 320 is n28a. Of course, in practical applications, a frequency band (Bx) of the first Tx signal and a frequency band (ny) of the second Tx signal may also be other frequency bands, and are not limited in the implementations of the present disclosure.

B20 includes uplink frequencies of 832 megahertz (MHz)-862 MHz and downlink frequencies of 791 MHz-821 MHz. n28a includes uplink frequencies of 703 MHz-733 MHz and downlink frequencies of 758 MHz-788 MHz. Therefore, a frequency of the antenna a 310 is within 832 MHz-862 MHz, a frequency of the antenna b 320 is within 703 MHz-733 MHz, a frequency of the antenna e 330 is within 791 MHz-821 MHz, and a frequency of the antenna d 340 is within 758 MHz-788 MHz.

The present disclosure provides a four-antenna solution, which realizes complete decoupling for antennas of two frequency bands in a combination of an FDD low-frequency-plus-low-frequency E-UTRA and new radio dual connectivity (EN-DC, which is a dual connectivity of 4G wireless access network and 5G NR). Duplexers and filters used in circuits are all conventional components and are low in cost. After a low frequency band is divided, a problem that a wide frequency band in a low frequency is difficult to be realized in a mobile phone can be avoided, and antennas are easier to be realized.

Alternatively, a first Tx signal (Tx_Bx) may be an LTE low frequency signal, and a second Tx signal (Tx_By) may be an LTE low frequency signal. Correspondingly, a first PRx signal (PRx_Bx) and a first DRx signal (DRx_Bx) may be LTE low frequency signals, and a second PRx signal (PRx_By) and a second DRx signal (DRx_By) may be LTE low frequency signals. In other words, the antenna a 310 is a 4G antenna, and the antenna b 320 is a 4G antenna.

Exemplarily, a frequency band of the first Tx signal is B20, and a frequency band of the second Tx signal is B28a. An operating frequency band of the antenna a 310 is B20, and an operating frequency band of the antenna b 320 is B28a. Of course, in practical applications, a frequency band (Bx) of the first Tx signal and a frequency band (By) of the second Tx signal may also be other frequency bands, and are not limited in the implementations of the present disclosure.

B20 includes uplink frequencies of 832 MHz-862 MHz and downlink frequencies of 791 MHz-821 MHz. B28a includes uplink frequencies of 703 MHz-725.5 MHz and downlink frequencies of 758 MHz-788 MHz. Therefore, a frequency of the antenna a 310 is within 832 MHz-862 MHz, a frequency of the antenna b 320 is within 703 MHz-725.5 MHz, a frequency of the antenna e 330 is within 791 MHz-821 MHz, and a frequency of the antenna d 340 is within 758 MHz-788 MHz.

Alternatively, a first Tx signal (Tx_nx) may be a 5G NR low frequency signal, and a second Tx signal (Tx_ny) may be a 5G NR low frequency signal. Correspondingly, a first PRx signal (PRx_nx) and a first DRx signal (DRx_nx) may be 5G NR low frequency signals, and a second PRx signal (PRx_ny) and a second DRx signal (DRx_ny) may be 5G NR low frequency signals. In other words, the antenna a 310 is a 5G antenna, and the antenna b 320 is a 5G antenna.

Exemplarily, a frequency band of the first Tx signal is n20, and a frequency band of the second Tx signal is n28a. An operating frequency band of the antenna a 310 is n20, and an operating frequency band of the antenna b 320 is n28a. Of course, in practical applications, a frequency band (nx) of the first Tx signal and a frequency band (ny) of the second Tx signal may also be other frequency bands, and are not limited in the implementations of the present disclosure.

n20 includes uplink frequencies of 832 MHz-862 MHz and downlink frequencies of 791 MHz-821 MHz. n28a includes uplink frequencies of 703 MHz-733 MHz and downlink frequencies of 758 MHz-788 MHz. Therefore, a frequency of the antenna a 310 is within 832 MHz-862 MHz, a frequency of the antenna b 320 is within 703 MHz-733 MHz, a frequency of the antenna e 330 is within 791 MHz-821 MHz, and a frequency of the antenna d 340 is within 758 MHz-788 MHz.

The RF transceiver module 110 may include a first Tx unit, a second Tx unit, a first PRx unit, a second PRx unit, a first DRx unit, and a second DRx unit. The first Tx unit is coupled with the first amplification circuit 410, and the first Tx unit is configured to output the first Tx signal. The second Tx unit is coupled with the second amplification circuit 420, and the second Tx unit is configured to output the second Tx signal. The first PRx unit is coupled with the second sub-end 2112 of the first duplexer 210, and the first PRx unit is configured to receive the first PRx signal. The second PRx unit is coupled with the second sub-end 2212 of the second duplexer 220, and the second PRx unit is configured to receive the second PRx signal. The first DRx unit is coupled with the filter c 230, and the first DRx unit is configured to receive the first DRx signal. The second DRx unit is coupled with the filter b 240, and the second DRx unit is configured to receive the second DRx signal.

On this basis, the RF module provided by the implementations of the present disclosure can further include multiple third amplification circuits 430. Third amplification circuits 430 are disposed between the filter c 230 and the RF transceiver module 110, the filter b 240 and the RF transceiver module 110, the second sub-end 2112 of the first duplexer 210 and the RF transceiver module 110, and the second sub-end 2212 of the second duplexer 220 and the RF transceiver module 110, respectively.

Figure 4:
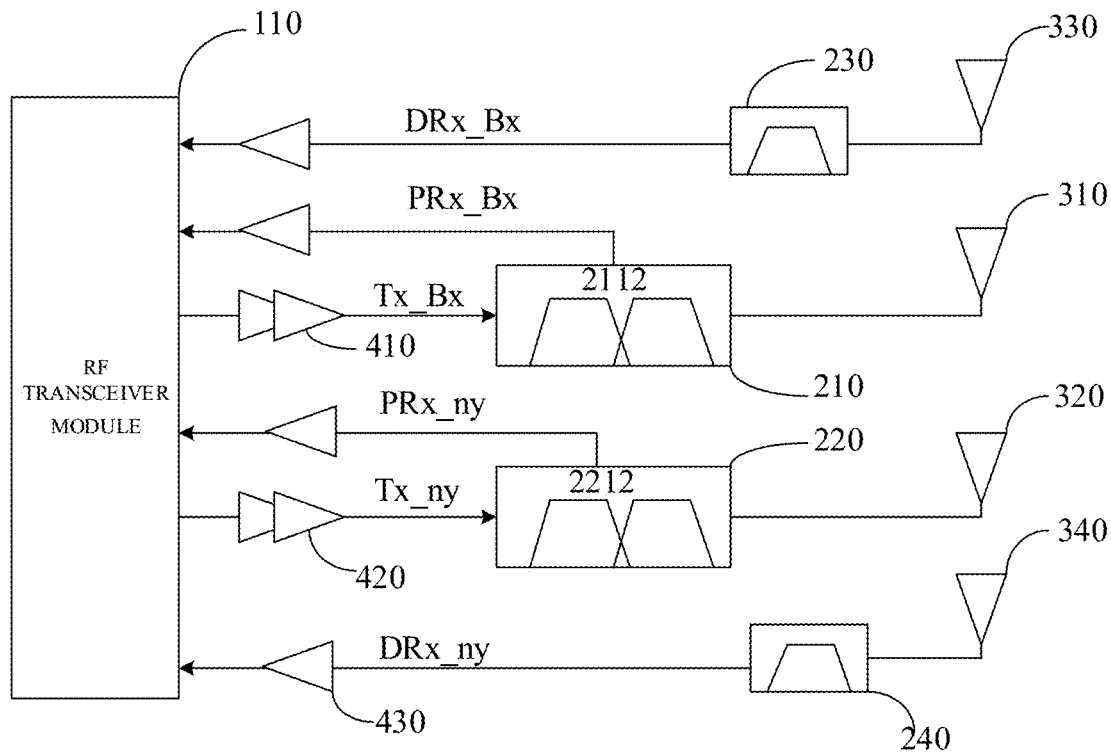
FIG. 4 is a schematic view of a RF module provided by other exemplary implementations of the present disclosure.

Reference can be made to FIG. 4, and a third amplification circuit 430 is coupled between the filter c 230 and the first DRx unit and is configured to amplify the first DRx signal. A third amplification circuit 430 is coupled between the filter b 240 and the second DRx unit and is configured to amplify the second DRx signal. A third amplification circuit 430 is coupled between the second sub-end 2112 of the first duplexer 210 and the first PRx unit to amplify the first PRx signal. A third amplification circuit 430 is coupled between the second sub-end 2212 of the second duplexer 220 and the second PRx unit to amplify the second PRx signal.

The RF transceiver module 110 may be a RF transceiver, and the third amplification circuit 430 may be disposed in the RF transceiver module 110 or outside the RF transceiver module 110. When the third amplification circuit 430 is disposed outside the RF transceiver module 110, the third amplification circuit 430 may be a low noise amplifier (LNA).

Figure 5:
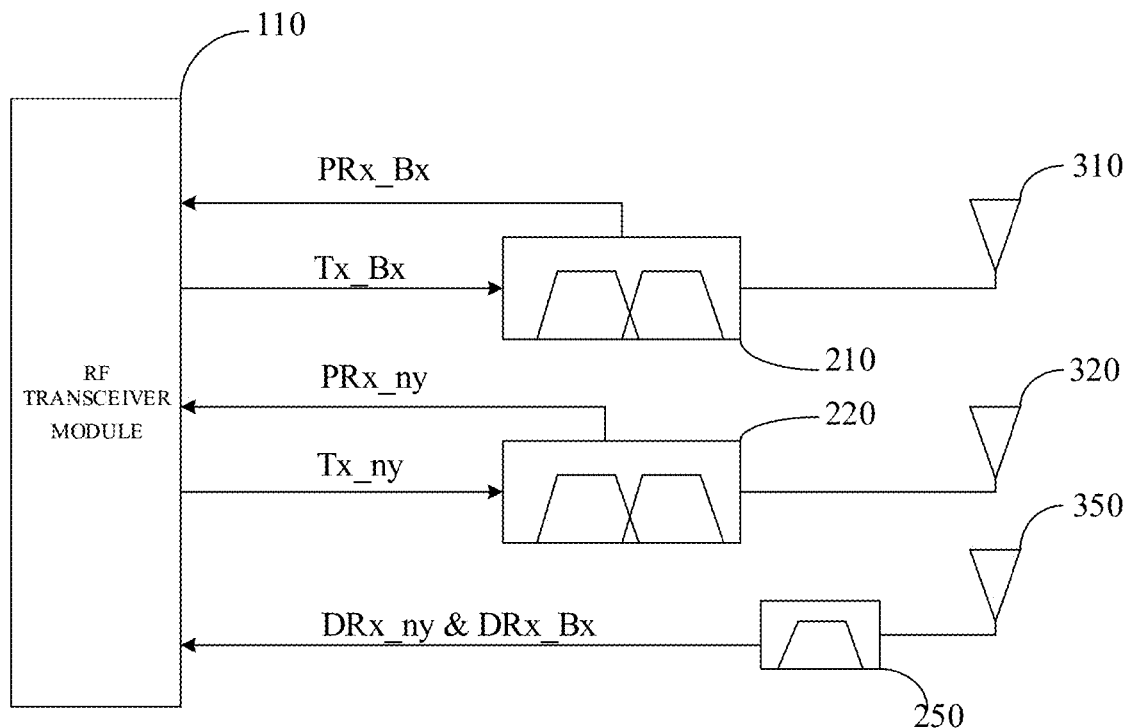
FIG. 5 is a schematic view of a RF module provided by other exemplary implementations of the present disclosure.

In a possible implementation, reference can be made to FIG. 5, and a RF module provided by the implementations of the present disclosure can further include an antenna c 350 and a filter a 250. In this implementation, the antenna c 350 and the filter a 250 can also be interpreted as the third antenna 330 and the first filter 230. The antenna c 350 is configured to receive the first DRx signal and the second DRx signal. The first filter 250 is coupled with the antenna c 350 and the RF transceiver module 110 respectively, and the first filter 250 is configured to filter the first DRx signal and the second DRx signal.

Figure 6:
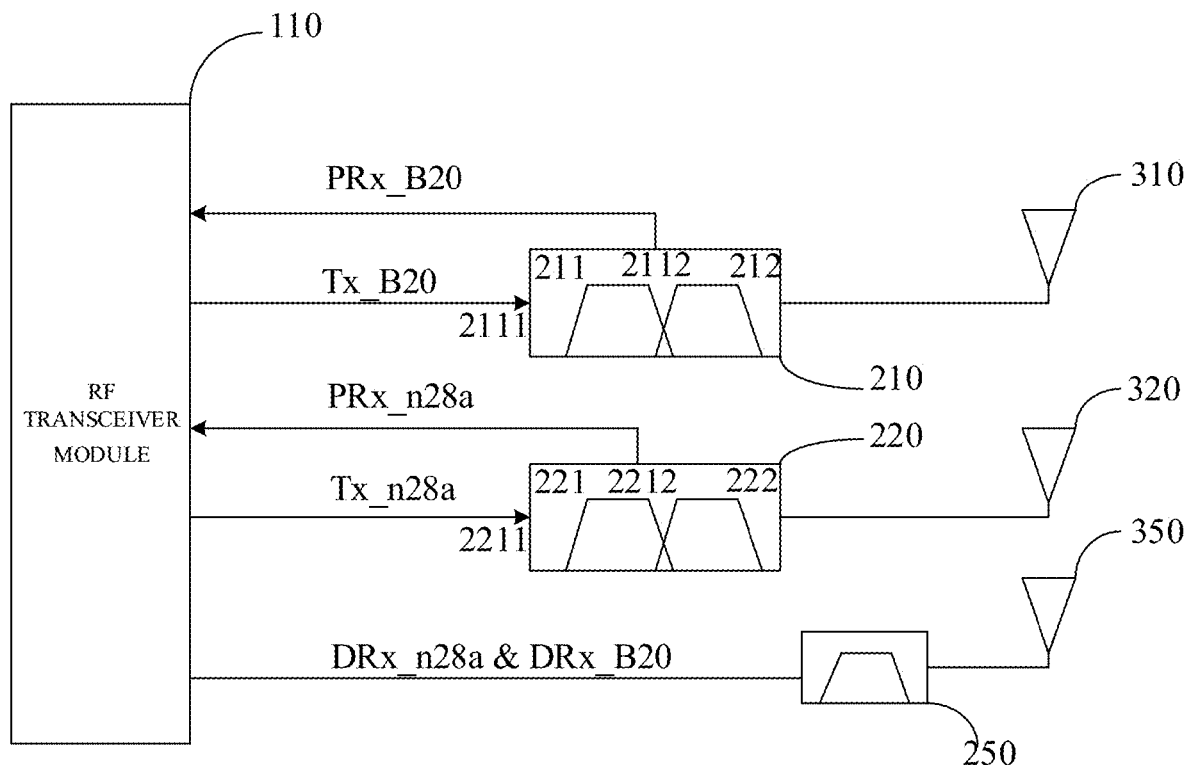
FIG. 6 is a schematic view of a RF module provided by other exemplary implementations of the present disclosure.

Reference can be made to FIG. 6, a first end 211 of the first duplexer 210 includes a first sub-end 2111 and a second sub-end 2112, the first sub-end 2111 is coupled with the RF transceiver module 110 to transmit the first Tx signal, and the second sub-end 2112 is coupled with the RF transceiver module 110 to transmit the first PRx signal.

Figure 7:
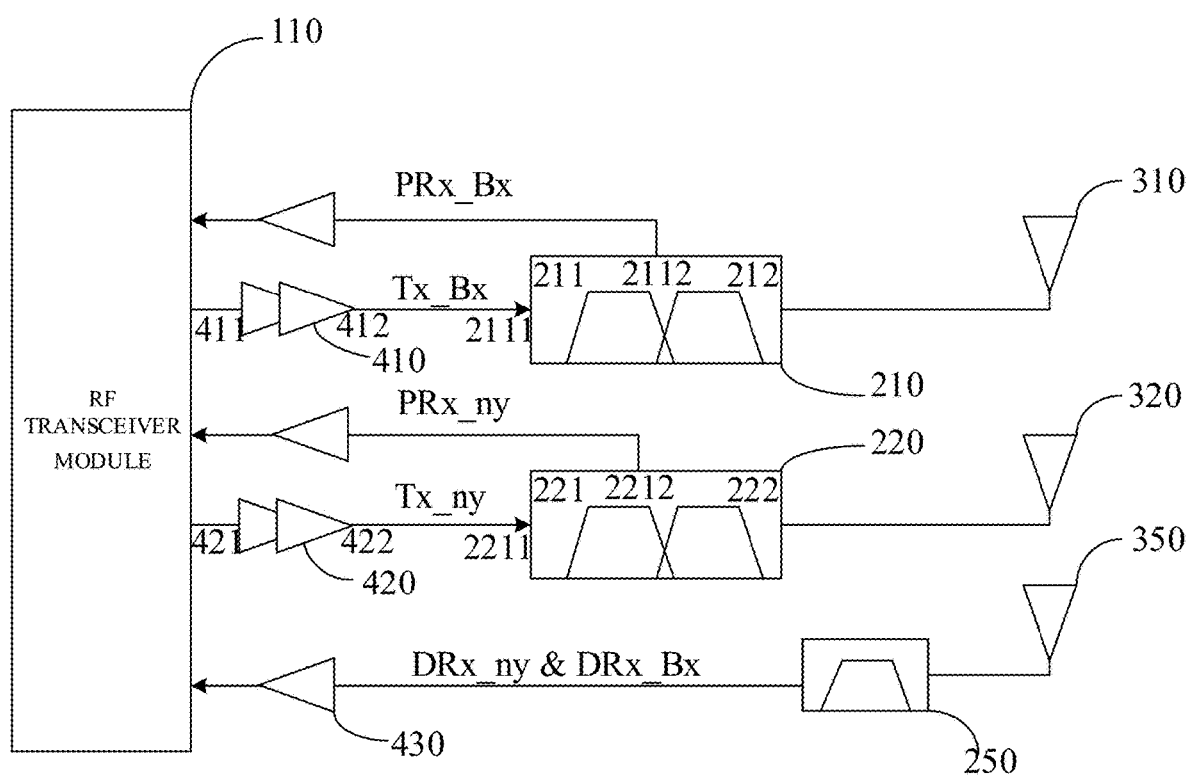
FIG. 7 is a schematic view of a RF module provided by other exemplary implementations of the present disclosure.

On this basis, reference can be made to FIG. 7, the RF module can further include the first amplification circuit 410, a first end 411 of the first amplification circuit 410 is coupled with the RF transceiver module 110, a second end 412 of the first amplification circuit 410 is coupled with the first sub-end 2111 of the first duplexer 210, and the first amplification circuit 410 is configured to amplify the first Tx signal.

A first end 221 of the second duplexer 220 includes a first sub-end 2211 and a second sub-end 2212, the first sub-end 2211 is coupled with the RF transceiver module 110 to transmit the second Tx signal, and the second sub-end 2212 is coupled with the RF transceiver module 110 to transmit the second PRx signal.

On this basis, the RF module can further include the second amplification circuit 420, a first end 421 of the second amplification circuit 420 is coupled with the RF transceiver module 110, a second end 422 of the second amplification circuit 420 is coupled with the first sub-end 2211 of the second duplexer 220, and the second amplification circuit 420 is configured to amplify the second Tx signal.

The RF module provided by the implementations of the present disclosure may be the FDD RF module, that is, various paths of signals have different uplink frequency bands and downlink frequency bands, therefore, the first Tx signal and the first PRx signal can be isolated by the first duplexer 210 and the second Tx signal and the second PRx signal can be isolated by the second duplexer 220.

The antenna a 310 is configured to receive a PRx signal in a first frequency band and transmit a Tx signal (Tx_Bx) in the first frequency band. The antenna b 320 is configured to receive a PRx signal in a second frequency band and transmit a Tx signal in the second frequency band. The antenna c 350 is configured to receive DRx signals in the first frequency band and the second frequency band. The RF module is configured to realize 4G and 5G dual-connectivity communication (EN-DC) in the first frequency band and the second frequency band or carrier aggregation in the first frequency band and the second frequency band.

In this implementation, the first Tx signal is a Tx signal in a first 4G frequency band, the first PRx signal is a PRx signal in the first 4G frequency band, the second Tx signal is a Tx signal in a second 5G frequency band, the second PRx signal is a PRx signal in the second 5G frequency band, the first DRx signal is a DRx signal in the first 4G frequency band, and the second DRx signal is a DRx signal in the second 5G frequency band. The antenna a 310 is configured to receive a PRx signal in a 4G frequency band and transmit a Tx signal in the 4G frequency band. The antenna b 320 is configured to receive a PRx signal in a 5G frequency band and transmit a Tx signal in the 5G frequency band. The antenna c 350 is configured to receive DRx signals in the 4G frequency band and the 5G frequency band. The RF module is configured to realize dual-connectivity communication in the first 4G frequency band and the second 5G frequency band.

Reference can be FIG. 5, the first Tx signal (Tx_Bx) may be an LTE low frequency signal, the second Tx signal (Tx_ny) may be a 5G NR low frequency signal. Correspondingly, the first PRx signal (PRx_Bx) and the first DRx signal (DRx_Bx) may be LTE low frequency signals, and the second PRx signal (PRx_ny) and the second DRx signal (DRx_ny) may be 5G NR low frequency signals. In other words, the antenna a 310 is a 4G antenna, the antenna b 320 is a 5G antenna, and the antenna c 350 is shared.

Exemplarily, a frequency band of the first Tx signal is B20, a frequency band of the second Tx signal is n28a. An operating frequency band of the antenna a 310 is B20, and an operating frequency band of the antenna b 320 is n28a. A frequency band of the first DRx signal may be B20, and a receive (Rx) signal of the second DRx unit may be n28a. The antenna c 350 can receive a DRx signal, and frequency bands of the DRx signal may be B20 and n28a. Of course, in practical applications, a frequency band (Bx) of the first Tx signal and a frequency band (ny) of the second Tx signal may also be other frequency bands, and are not limited in the implementations of the present disclosure.

B20 includes uplink frequencies of 832 MHz-862 MHz and downlink frequencies of 791 MHz-821 MHz. n28a includes uplink frequencies of 703 MHz-733 MHz and downlink frequencies of 758 MHz-788 MHz. Therefore, a frequency of the antenna a 310 is within 832 MHz-862 MHz, a frequency of the antenna b 320 is within 703 MHz-733 MHz, and a frequency of the antenna c 350 is within 758 MHz-821 MHz.

The present disclosure provides a three-antenna solution, which divides a frequency spectrum into three parts. The antenna b 320 covers 703 MHz-788 MHz, making a total of 85 MHz. The antenna a 310 covers 791 MHz-862 MHz, making a total of 71 MHz. The antenna c 350 covers 758 MHz-821 MHz, making a total of 63 MHz. The antenna b 320 realizes Tx and PRx in n28, the antenna a 310 realizes Tx and PRx in B20, and the antenna c 350 realizes DRx in B20 and n28a simultaneously. The three antennas may be antennas of only low frequency, or multiplexed with other middle and high frequency bands. Duplexers and filters used in circuits are all conventional components and are low in cost. After a low frequency band is divided, a problem that a wide frequency band in a low frequency is difficult to be realized in a mobile phone can be avoided, and antennas are easier to be realized.

Alternatively, the first Tx signal is a Tx signal in a first 4G frequency band, the first PRx signal is a PRx signal in the first 4G frequency band, the second Tx signal is a Tx signal in a second 4G frequency band, the second PRx signal is a PRx signal in the second 4G frequency band, the first DRx signal is a DRx signal in the first 4G frequency band, and the second DRx signal is a DRx signal in the second 4G frequency band. The antenna a 310 is configured to receive the PRx signal in the first 4G frequency band and transmit the Tx signal in the first 4G frequency band. The antenna b 320 is configured to receive the PRx signal in the second 4G frequency band and transmit the Tx signal in the second 4G frequency band. The antenna c 350 is configured to receive DRx signals in the first 4G frequency band and the second 4G frequency band. The RF module is configured to realize carrier aggregation in the first 4G frequency band and the second 4G frequency band.

The first Tx signal (Tx_Bx) may be an LTE low frequency signal, and the second Tx signal (Tx_By) may be an LTE low frequency signal. Correspondingly, the first PRx signal (PRx_Bx) and the first DRx signal (DRx_Bx) may be LTE low frequency signals, and the second PRx signal (PRx_By) and the second DRx signal (DRx_By) may be LTE low frequency signals. In other words, the antenna a 310 is a 4G antenna, the antenna b 320 is a 4G antenna, and the antenna c 350 is shared.

B20 includes uplink frequencies of 832 MHz-862 MHz and downlink frequencies of 791 MHz-821 MHz. B28a includes uplink frequencies of 703 MHz-725.5 MHz and downlink frequencies of 758 MHz-788 MHz. Therefore, a frequency of the antenna a 310 is within 832 MHz-862 MHz, a frequency of the antenna b 320 is within 703 MHz-725.5 MHz, and a frequency of the antenna c 350 is within 758 MHz-821 MHz.

Exemplarily, a frequency band of the first Tx signal is B20, a frequency band of the second Tx signal is B28a. An operating frequency band of the antenna a 310 is B20, and an operating frequency band of the antenna b 320 is B28a. A frequency band of the first DRx signal may be B20, and a Rx signal of the second DRx unit may be B28a. The antenna c 350 can receive a DRx signal, and frequency bands of the DRx signal may be B20 and n28a. Of course, in practical applications, a frequency band (Bx) of the first Tx signal and a frequency band (By) of the second Tx signal may also be other frequency bands, and are not limited in the implementations of the present disclosure.

Alternatively, the first Tx signal is a Tx signal in a first 5G frequency band, the first PRx signal is a PRx signal in the first 5G frequency band, the second Tx signal is a Tx signal in a second 5G frequency band, the second PRx signal is a PRx signal in the second 5G frequency band, the first DRx signal is a DRx signal in the first 5G frequency band, and the second DRx signal is a DRx signal in the second 5G frequency band. The antenna a 310 is configured to receive the PRx signal in the first 5G frequency band and transmit the Tx signal in the first 5G frequency band. The antenna b 320 is configured to receive the PRx signal in the second 5G frequency band and transmit the Tx signal in the second 5G frequency band. The antenna c 350 is configured to receive DRx signals in the first 5G frequency band and the second 5G frequency band. The RF module is configured to realize carrier aggregation in the first 5G frequency band and the second 5G frequency band.

The first Tx signal (Tx_nx) may be a 5G NR low frequency signal, and the second Tx signal (Tx_ny) may be a 5G NR low frequency signal. Correspondingly, the first PRx signal (PRx_nx) and the first DRx signal (DRx_nx) may be 5G NR frequency signals, and the second PRx signal (PRx_ny) and the second DRx signal (DRx_ny) may be 5G NR low frequency signals. In other words, the antenna a 310 is a 5G antenna, the antenna b 320 is a 5G antenna, and the antenna c 350 is shared.

Exemplarily, a frequency band of the first Tx signal is n20, a frequency band of the second Tx signal is n28a. An operating frequency band of the antenna a 310 is n20, and an operating frequency band of the antenna b 320 is n28a. A frequency band of the first DRx signal may be n20, and a Rx signal of the second DRx unit may be n28a. The antenna c 350 can receive a DRx signal, and frequency bands of the DRx signal may be B20 and n28a. Of course, in practical applications, a frequency band (nx) of the first Tx signal and a frequency band (ny) of the second Tx signal may also be other frequency bands, and are not limited in the implementations of the present disclosure.

n20 includes uplink frequencies of 832 MHz-862 MHz and downlink frequencies of 791 MHz-821 MHz. n28a includes uplink frequencies of 703 MHz-733 MHz and downlink frequencies of 758 MHz-788 MHz. Therefore, a frequency of the antenna a 310 is within 832 MHz-862 MHz, a frequency of the antenna b 320 is within 703 MHz-733 MHz, and a frequency of the antenna c 350 is within 758 MHz-821 MHz.

The RF transceiver module 110 may include a first Tx unit, a second Tx unit, a first PRx unit, a second PRx unit, and a third DRx unit. The first Tx unit is coupled with the first amplification circuit 410, and the first Tx unit is configured to output the first Tx signal. The second Tx unit is coupled with the second amplification circuit 420, and the second Tx unit is configured to output the second Tx signal. The first PRx unit is coupled with the second sub-end 2112 of the first duplexer 210, and the first PRx unit is configured to receive the first PRx signal. The second PRx unit is coupled with the second sub-end 2212 of the second duplexer 220, and the second PRx unit is configured to receive the second PRx signal. The third DRx unit is coupled with a filter a 250, and the third DRx unit is configured to receive the first DRx signal and the second DRx signal.

On this basis, the RF module provided by implementations of the present disclosure can further include multiple third amplification circuits 430. Third amplification circuits 430 are disposed between each of the first filter 250, the second sub-end 2112 of the first duplexer 210, and the second sub-end 2212 of the second duplexer 220 and the RF transceiver module 110.

A third amplification circuit 430 is coupled between the first filter 250 and the third DRx unit and configured to amplify the first DRx signal and the second DRx signal. A third amplification circuit 430 is coupled between the second sub-end 2112 of the first duplexer 210 and the first PRx unit to amplify the first PRx signal. A third amplification circuit 430 is coupled between the second sub-end 2212 of the second duplexer 220 and the second PRx unit to amplify the second PRx signal.

The RF transceiver module 110 may be a RF transceiver, and the third amplification circuit 430 may be disposed in the RF transceiver module 110 or outside the RF transceiver module 110. When the third amplification circuit 430 is disposed outside the RF transceiver module 110, the third amplification circuit 430 may be an LNA.

In the RF module provided by the implementations of the present disclosure, the antenna a 310 transmits a first Tx signal and receives a first PRx signal, the first duplexer 210 isolates the first Tx signal and the first PRx signal, the antenna b 320 transmits a second Tx signal and receives a second PRx signal, and the second duplexer 220 isolates the second Tx signal and the second PRx signal, where the antenna a 310 can be used for 4G communication, and the antenna b 320 can be used for 5G communication. Therefore, the electronic device can realize communication in dual connectivity of 4G and 5G in the NSA mode, and is simple in structure and easy to be implemented.

In other possible implementations, the antenna c 350 can also be configured to transmit the first Tx signal or transmit the second Tx signal.

An electronic device is further provided in exemplary implementations of the present disclosure, and the electronic device includes the above RF module.

Figure 8:
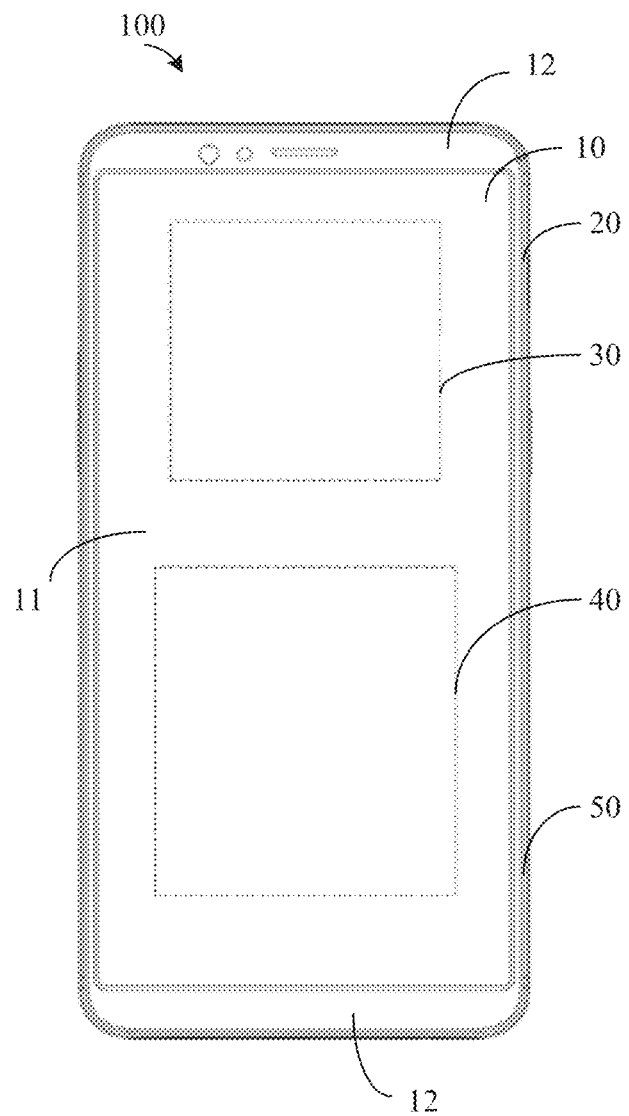
FIG. 8 is a schematic view of an electronic device provided by exemplary implementations of the present disclosure.

Reference can be made to FIG. 8, and an electronic device 100 provided by implementations of the present disclosure further includes a display screen 10, a frame 20, a mainboard 30, a battery 40, and a rear cover 50. The display screen 10 is mounted on the frame 20 to form a display surface of the electronic device 100, and the display screen 10 serves as a front casing of the electronic device 100. The rear cover 50 is adhered to the frame 20 by a double-sided tape, and the display screen 10, the frame 20, and the rear cover 50 define an accommodation space to accommodate other electronic components or functional modules of the electronic device 100. At the same time, the display screen 10 functions as the display surface of the electronic device 100 to display information such as images, texts, etc. The display screen 10 may be a display screen in a type of a liquid crystal display (LCD), an organic light-emitting diode (OLED) display, etc.

The display screen 10 may be provided with a glass cover plate, where the glass cover plate can cover the display screen 10 to protect the display screen 10 and prevent the display screen 10 from being scratched, or damaged by water.

The display screen 10 can have a display region 11 and a non-display region 12. The display region 11 performs a display function of the display screen 10, and is configured to display information such as images, texts, etc. The non-display region 12 does not display information. Functional modules such as a camera, a receiver, a proximity sensor, etc., may be disposed in the non-display region 12. In some implementations, the non-display region 12 may have at least one region located at an upper part and a lower part of the display region 11.

The display screen 10 may be a full screen. In this case, the display screen 10 can display information with the whole screen, such that the electronic device 100 has a relatively large screen-to-body ratio. The display screen 10 only has the display region 11 but does not have the non-display region 12. In this case, functional modules of the electronic device 100, such as a camera, a proximity sensor, etc., can be hidden under the display screen 10, and a fingerprint recognition module of the electronic device 100 can be disposed on a rear surface of the electronic device 100.

The frame 20 may have a hollow frame structure, where the frame 20 can be made of metal or plastics. The mainboard 30 is mounted in the above accommodation space. For example, the mainboard 30 can be mounted on the frame 20 and accommodated in the above accommodation space along with the frame 20. The mainboard 30 is provided with a ground point to realize grounding of the mainboard 30. The mainboard 30 may be integrated with one or more of functional modules, such as a motor, a microphone, a speaker, a receiver, an earphone interface, a universal serial bus (USB) interface, a camera, a proximity sensor, an environment light sensor, a gyroscope, a processor, etc. At the same time, the display screen 10 can be electrically coupled with the mainboard 30.

The mainboard 30 is provided with a display control circuit. The display control circuit is configured to output electrical signals to the display screen 10 to control the display screen 10 to display information.

The battery 40 is mounted in the above accommodation space. For example, the battery 40 can be mounted on the frame 20 and accommodated in the above accommodation space along with the frame 20. The battery 40 can be electrically coupled with the mainboard 30 to supply power for the electronic device 100. The mainboard 30 can be provided with a power management circuit. The power management circuit is configured to distribute voltage provided by the battery 40 to various electronic components of the electronic device 100.

The rear cover 50 constitutes an external contour of the electronic device 100. The rear cover 50 can be integrally molded. In a molding process of the rear cover 50, structures such as a rear camera hole, a mounting hole for a fingerprint recognition module, etc., can be defined on the rear cover 50.

Components in the RF module, such as the RF transceiver module 110, the first duplexer 210, the second duplexer 220, the filter c 230, the filter b 240, a first amplifier, a second amplifier, a third amplifier, etc., can be disposed on the mainboard 30. The mainboard 30 can be further provided with a ground portion, the antenna a 310, the antenna b 320, and the antenna c 350 all can be coupled with the ground portion, or the antenna a 310, the antenna b 320, the antenna e 330, and the antenna d 340 all can be coupled with the ground portion.

The antenna a 310, the antenna b 320, and the antenna c 350 can be disposed on the mainboard 30, the frame 20, or the rear cover 50; or the antenna a 310, the antenna b 320, the antenna e 330, and the antenna d 340 can be disposed on the mainboard 30, the frame 20, or the rear cover 50. When antennas are disposed on the frame 20, the frame 20 may be a metal frame, and the metal frame is separated into multiple segments by insulators. When the antennas are disposed on the rear cover 50, the rear cover 50 may be a metal rear cover, and the metal rear cover can be separated into multiple segments.

The antenna a 310, the antenna b 320, the antenna e 330, the antenna d 340, and the antenna c 350 may be special antennas for low frequency signals, or may be antennas shared by high frequency signals. When the antennas are antennas shared by high frequency signals, the mainboard 30 can be further provided with a switching circuit, which is configured to switch connections among the antennas and RF modules with different frequencies.

In the electronic device provided in the present disclosure, the antenna a transmits the first Tx signal and receives the first PRx signal, the first duplexer isolates the first Tx signal and the first PRx signal, the antenna b transmits the second Tx signal and receives the second PRx signal, and the second duplexer isolates the second Tx signal and the second PRx signal, where the antenna a can be used for 4G communication and the antenna b can be used for 5G communication. Therefore, the electronic device can realize communication in dual connectivity of 4G and 5G in the NSA mode, and is simple in structure and easy to be implemented.

Figure 9:
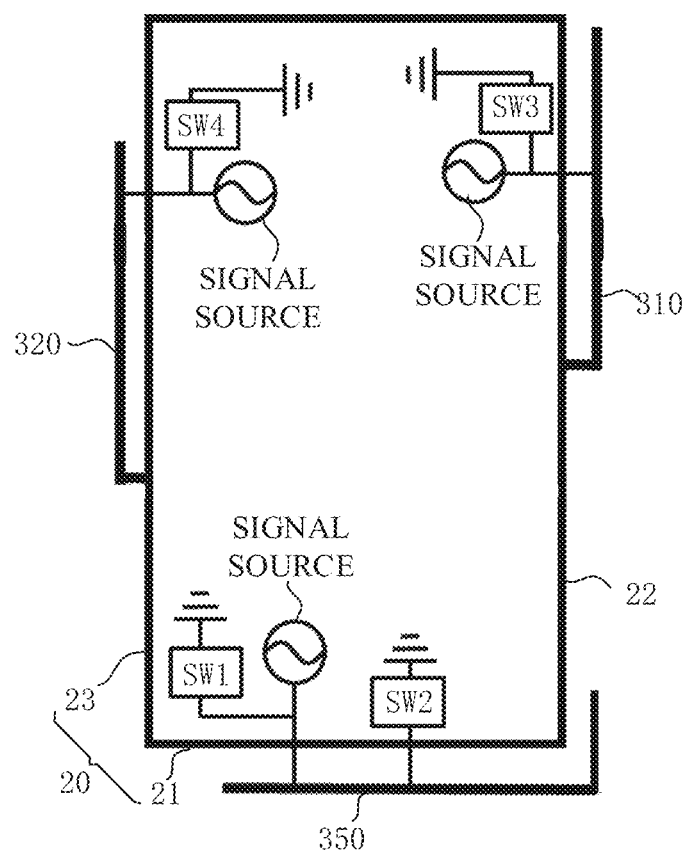
FIG. 9 is a schematic structural view of an electronic device provided by exemplary implementations of the present disclosure.

Exemplarily, reference can be made to FIG. 9, and the frame 20 includes a bottom wall 21, a first side wall 22, and a second side wall 23, where the first side wall 22 and the second side wall 23 are disposed opposite to each other at two ends of the bottom wall 21, and the two ends of the bottom wall 21 are connected with the first side wall 22 and the second side wall 23 respectively. The antenna c 350 is disposed on the bottom wall 21, the antenna a 310 is disposed on the first side wall 22, and the antenna b 320 is disposed on the second side wall 23.

In this way, the RF module enables the electronic device 100 to realize 4G communication and 5G communication through the antenna a 310, the antenna b 320, and the antenna c 350, so as to meet 5G communication requirements of standalone (SA), or NSA, etc. In addition, the antenna c 350 is disposed on the bottom wall 21, and the antenna a 310 and the antenna b 320 are disposed on the first side wall 22 and the second side wall 23 respectively, which can not only ensure that electromagnetic radiation reaches standards, but also make the antennas have relatively great isolation among the antennas. At the same time, design difficulty is also reduced to save costs.

Exemplarily, the antenna a 310 is disposed at a part of the first side wall 22 away from the bottom wall 21 and is misaligned with the antenna b 320, and the antenna c 350 is disposed at a part of the bottom wall 21 close to the first side wall 22.

Figure 10:
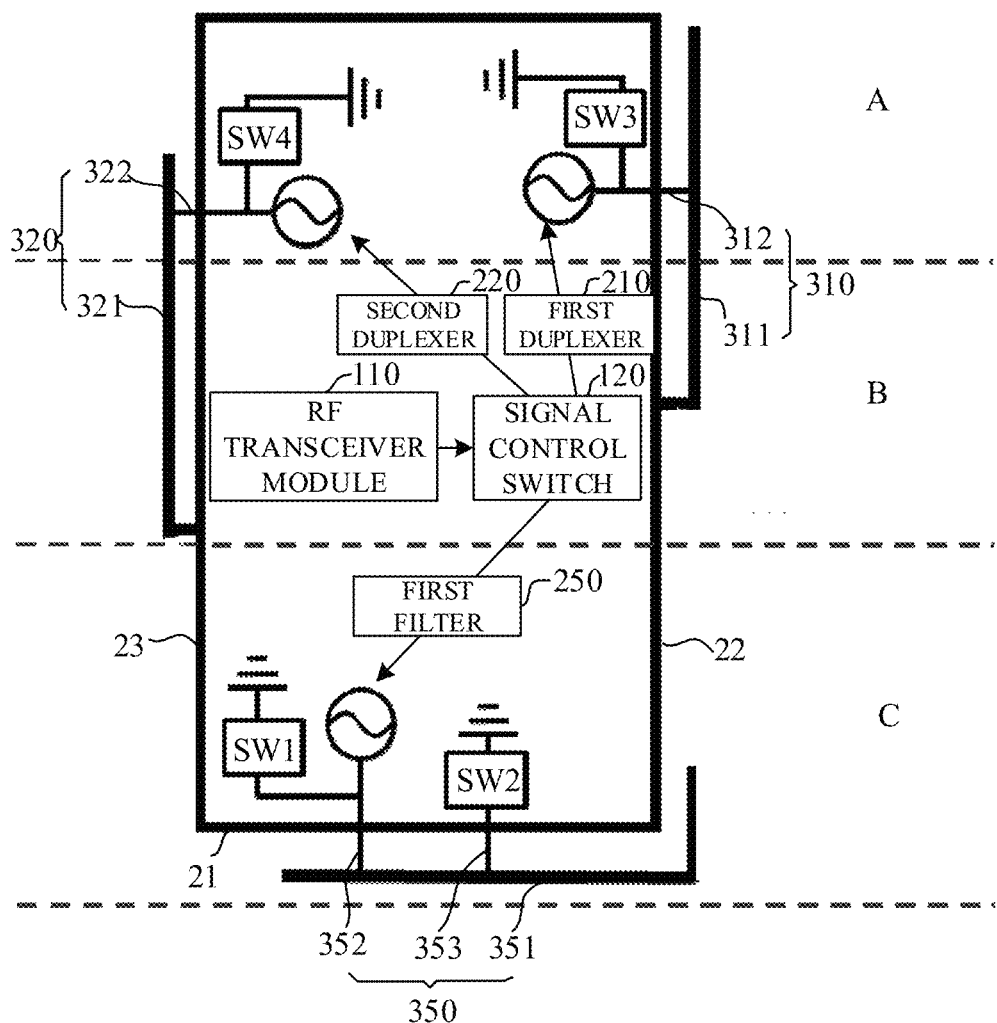
FIG. 10 is a schematic structural view of an electronic device provided by other exemplary implementations of the present disclosure.

Reference can be made to FIG. 10, and the first side wall 22 and the second side wall 23 wall each are trisected into a bottom region C close to the bottom wall 21, a top region A away from the bottom wall 21, and a middle region B between the bottom region C and the top region A, in a length direction. The antenna a 310 and the antenna b 320 are located in the middle region B and the top region A, more than half of the antenna a 310 is located in the top region A, and more than half of the antenna b 320 is located in the middle region B.

Exemplarily, the antenna a 310 includes a first radiator 311 and a first feed line 312. The first radiator 311 is disposed at a side of the first side wall 22 away from the bottom wall 21, and the first feed line 312 penetrates through the first side wall 22 to be coupled with the first radiator 311.

Specifically, the first feed line 312 is coupled with the first radiator 311 and penetrates through the first side wall 22 into the frame 20, to form a third branch coupled with ground and a fourth branch coupled with the first duplexer 210. The third branch is further provided with an antenna c switch SW3 for controlling signal receiving or transmitting.

Furthermore, the antenna c switch SW3 can also be configured to adjust a frequency band range supported by the antenna a 310, such that the antenna a 310 can support different frequency bands under different situations. For example, a frequency band range of the first Tx signal is f1, a frequency band range of the second Tx signal is f2, and a frequency band range of the antenna a 310 is f1. In order to enable the antenna a 310 to transmit the second Tx signal, the frequency band range supported by the antenna a 310 can be adjusted from f1 to f2 through the antenna c switch SW3.

Exemplarily, the antenna b 320 includes a second radiator 321 and a second feed line 322. The second feed line 322 is coupled with the second duplexer 220, the second radiator 321 is disposed on the second side wall 23, and the second feed line 322 penetrates through the second side wall 23 to be coupled with the second radiator 321.

Specifically, the antenna b 320 includes the second radiator 321 and the second feed line 322. The second radiator 321 is disposed outside the second side wall 23 and is misaligned with the first radiator 311. It can be understood that the first radiator 311 is misaligned with the second radiator 321, which can further improve isolation between the first radiator 311 and the second radiator 321. The second feed line 322 is coupled with the second radiator 321 and penetrates through the second side wall 23 into the frame 20, to form a fifth branch coupled with ground and a sixth branch coupled with the second duplexer 220. The fifth branch is further provided with an antenna d switch SW4 for controlling signal receiving or transmitting.

Furthermore, the antenna d switch SW4 can also be configured to adjust a frequency band range supported by the antenna b 320, such that the antenna b 320 can support different frequency bands under different situations. For example, a frequency band range of the first Tx signal is f1, a frequency band range of the second Tx signal is f2, and a frequency band range of the antenna b 320 is f1. In order to enable the antenna b 320 to transmit the second Tx signal, the frequency band range supported by the antenna b 320 can be adjusted from f1 to f2 through the antenna d switch SW4.

Figure 11:
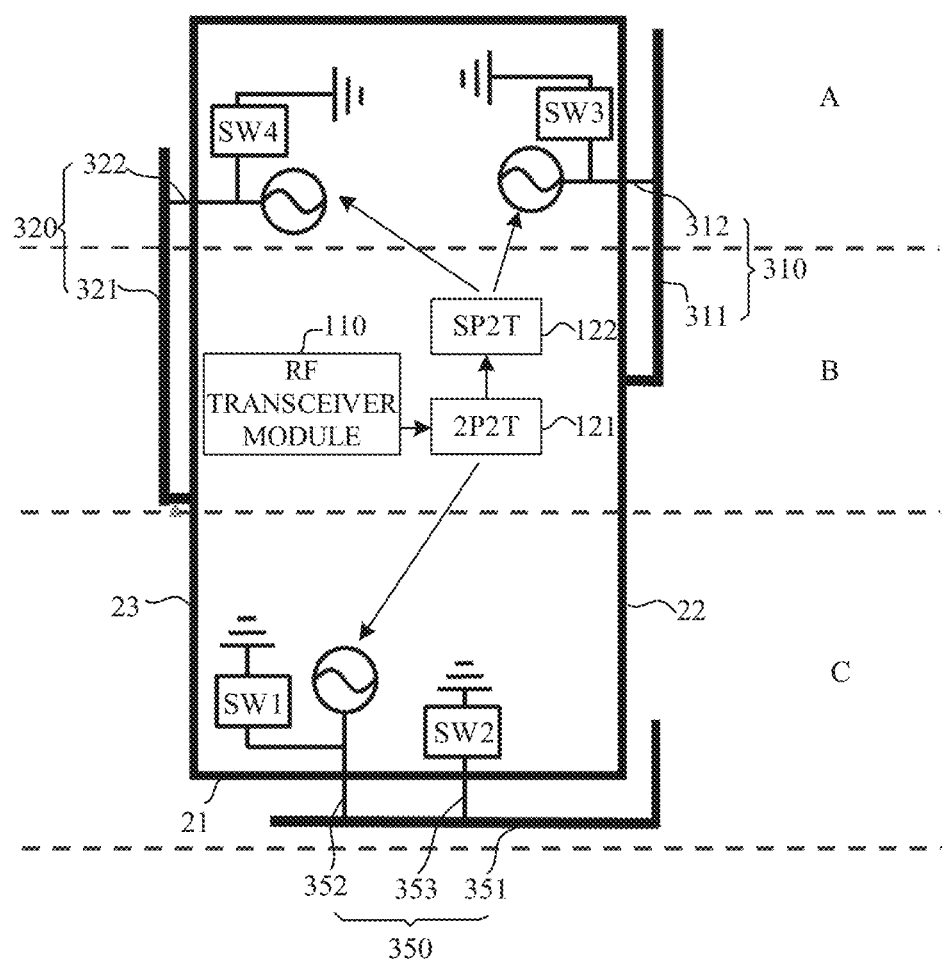
FIG. 11 is a schematic structural view of an electronic device provided by other exemplary implementations of the present disclosure.

Exemplarily, reference can be made to FIG. 11, and the antenna c 350 includes a third radiator 351, a third feed line 352, and a ground line 353. The third feed line 352 is coupled with the RF transceiver module 110, the third radiator 351 is disposed at a part of the bottom wall 21 close to the first side wall 22 and partially bends and extends towards the first side wall 22, and the third feed line 352 and the ground line 353 penetrate through the bottom wall 21 to be coupled with the third radiator 351.

Specifically, the antenna c 350 includes the third radiator 351, the third feed line 352, and the ground line 353. The third radiator 351 is disposed outside the bottom wall 21 and at the part of the bottom wall 21 close to the first side wall 22 and partially bends and extends towards the first side wall 22. The third feed line 352 is coupled with the third radiator 351 and penetrates through the bottom wall 21 into the frame 20 to form a first branch and a second branch. The first branch is coupled with ground, and the second branch is coupled with the RF transceiver module 110. The first branch further includes an antenna a switch SW1 for controlling signal receiving or transmitting. The ground line 353 is coupled with the third radiator 351, and penetrates through the bottom wall 21 into the frame 20 to be grounded. The ground line 353 is further provided with an antenna b switch SW2 for controlling signal receiving or transmitting.

Exemplarily, reference can be further made to FIG. 10, and the RF module includes a signal control switch 120. The signal control switch 120 is coupled with the first duplexer 210, the second duplexer 220, and the filter a 250 respectively to be coupled with the antenna a 310, the antenna b 320, and the antenna c 350. The signal control switch 120 is configured to assign RF signals to two antennas of the antenna a 310, the antenna b 320, and the antenna c 350.

For example, after the RF transceiver module 110 generates the RF signal, the signal control switch 120 can transmit the first Tx signal to the third feed line 352 to transmit the first Tx signal through the antenna c 350, and transmit the second Tx signal to the first feed line 312 to transmit the second Tx signal through the antenna a 310. In this way, through setting of the signal control switch 120, the RF module can randomly select two antennas from the antenna b 320, the antenna a 310, and the antenna c 350 to transmit the first Tx signal and the second Tx signal. Anti-interference ability of the RF module is enhanced, and user experience is improved.

In some implementations, reference can be made to FIG. 11, and the signal control switch 120 includes a first signal control sub-switch 121 and a second signal control sub-switch 122. The antenna c 350 is coupled with the RF transceiver module 110 through the first signal control sub-switch 121, and the antenna a 310 and the antenna b 320 are coupled with the first signal control sub-switch 121 through the second signal control sub-switch 122. The first signal control sub-switch 121 is configured to assign the first Tx signal and the second Tx signal transmitted by the RF transceiver module 110 to the antenna c 350 and the second signal control sub-switch 122, and the second signal control sub-switch 122 is configured to transmit the first Tx signal or the second Tx signal assigned by the first signal control sub-switch 121 to the antenna a 310 or the antenna b 320.

Specifically, when the RF module communicates, the first Tx signal and the second Tx signal are generated by the RF transceiver module 110 and transmitted to the first signal control sub-switch 121. The first signal control sub-switch 121 assigns the first Tx signal and the second Tx signal, thus transmitting the first Tx signal to the antenna c 350 and transmitting the second Tx signal to the second signal control sub-switch 122, or transmitting the second Tx signal to the antenna c 350 and transmitting the first Tx signal to the second signal control sub-switch 122. After the receiving the first Tx signal or the second Tx signal, the second signal control sub-switch 122 transmits the first Tx signal or the second Tx signal to the antenna a 310, or after receiving the first Tx signal or the second Tx signal, the second signal control sub-switch 122 transmits the first Tx signal or the second Tx signal to the antenna b 320. Furthermore, the first signal control sub-switch 121 may be a double pole double throw (2P2T) switch, and the second signal control sub-switch 122 may be a single pole double throw (SP2T) switch. It should be noted that in the present disclosure, the signal control switch 120 only assigns transmitting of the first Tx signal and the second Tx signal.

In this way, through arrangement of the first signal control sub-switch 121 and the second signal control sub-switch 122, the RF module can transmit the first Tx signal and the second Tx signal through the antenna c 350 and the antenna a 310, or through the antenna c 350 and the antenna b 320. In addition, since radiation efficiency of a single antenna supporting one kind of frequency band will be higher than radiation efficiency of a single antenna supporting two kinds of frequency bands, radiation efficiency of the RF module can be improved by means of the implementations compared with using two antennas both supporting two kinds of frequency bands.

Reference can be further made to FIG. 11, it can be understood that since an antenna generates electromagnetic radiation through a radiator, if the electronic device 100 is divided into three regions, that is, A, B and C, through arrangement of the third radiator 351, the first radiator 311, and the second radiator 321, electromagnetic radiation generated by the third radiator 351 is mainly in region C, electromagnetic radiation generated by the first radiator 311 is mainly in region A, and electromagnetic radiation generated by the second radiator 321 is mainly in region B. In this way, interference among electromagnetic waves generated by all antennas is reduced.

Figure 12:
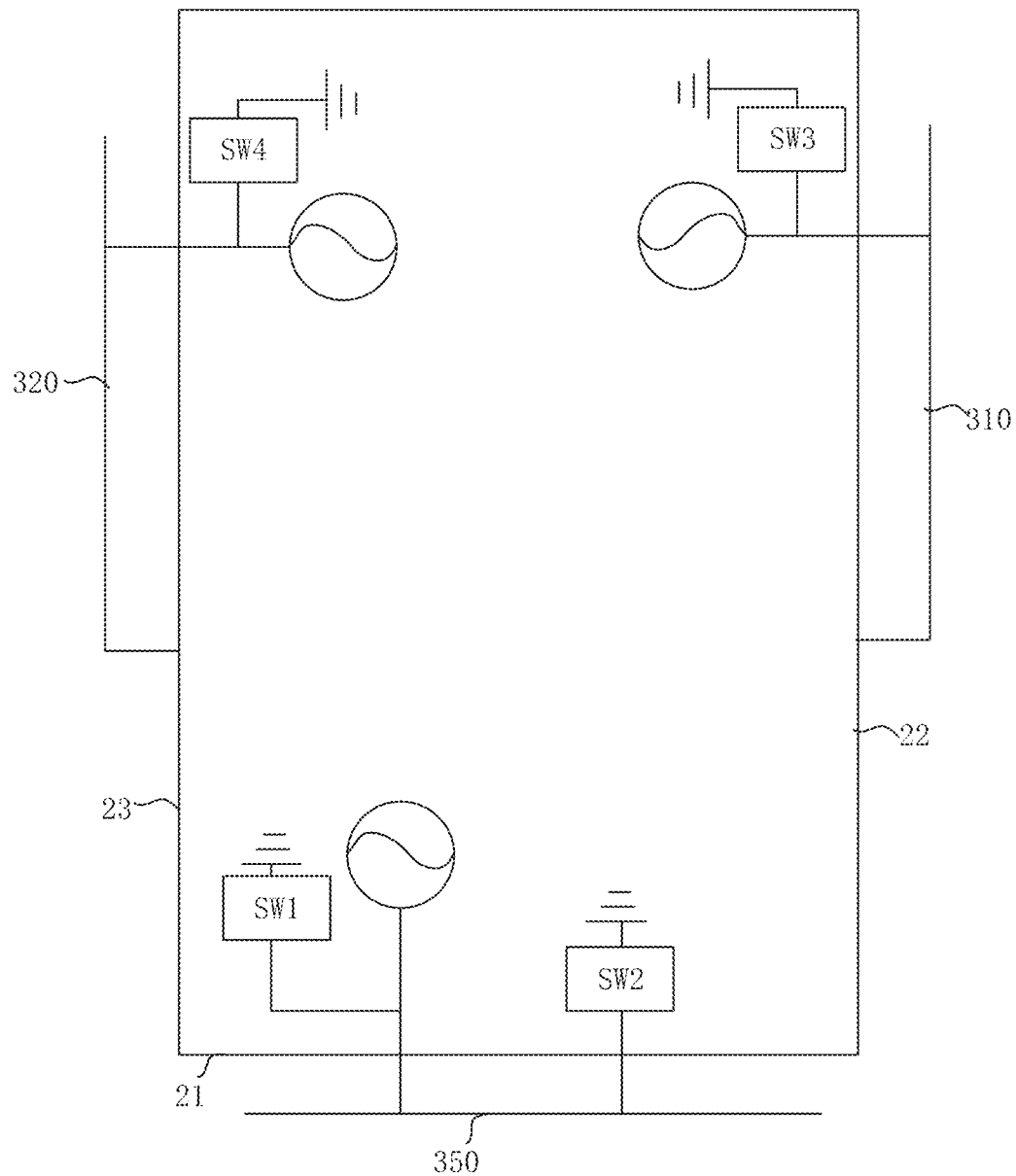
FIG. 12 is a schematic structural view of an electronic device provided by other exemplary implementations of the present disclosure.

In other implementations, reference can be made to FIG. 12, and the antenna a 310 and the antenna b 320 are symmetrically disposed.

Figure 13:
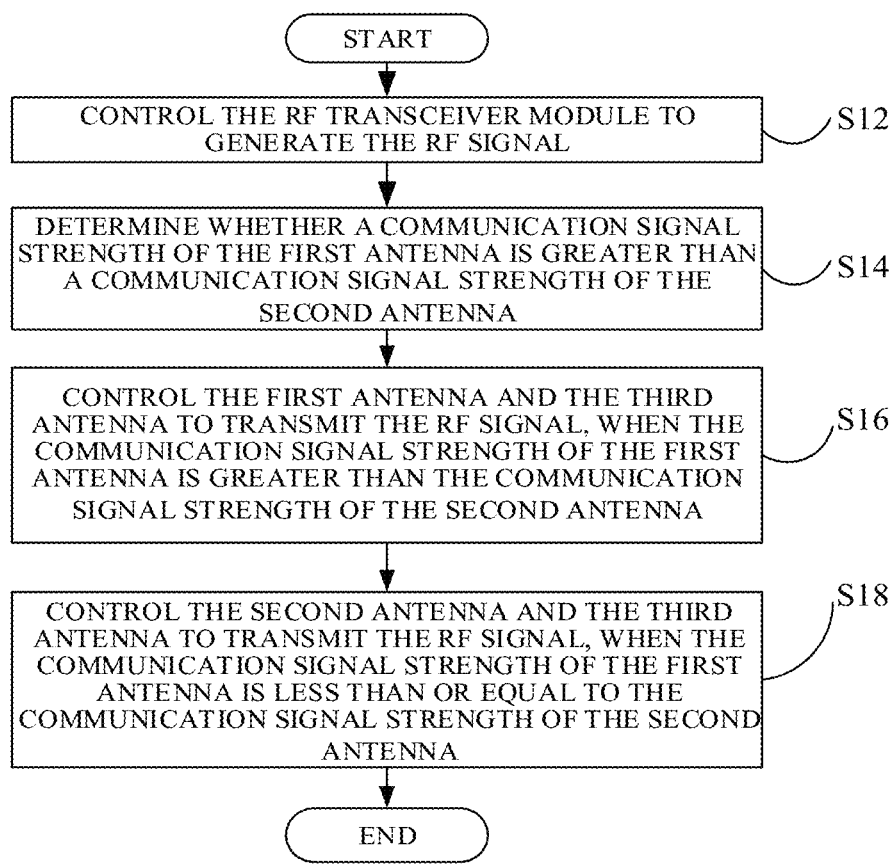
FIG. 13 is a schematic flow chart of a control method provided by exemplary implementations of the present disclosure.

Reference can be made to FIG. 13, a control method is provided by the present disclosure and applicable to the electronic device 100, and the control method includes the following operations.

At S12, the RF transceiver module is controlled to generate the RF signal.

At S14, whether a communication signal strength of the antenna a is greater than a communication signal strength of the antenna b is determined.

At S16, the antenna a and the antenna c are controlled to transmit the RF signal, when the communication signal strength of the antenna a is greater than the communication signal strength of the antenna b.

At S18, the antenna b and the antenna c are controlled to transmit the RF signal, when the communication signal strength of the antenna a is less than or equal to the communication signal strength of the antenna b.

Figure 14:
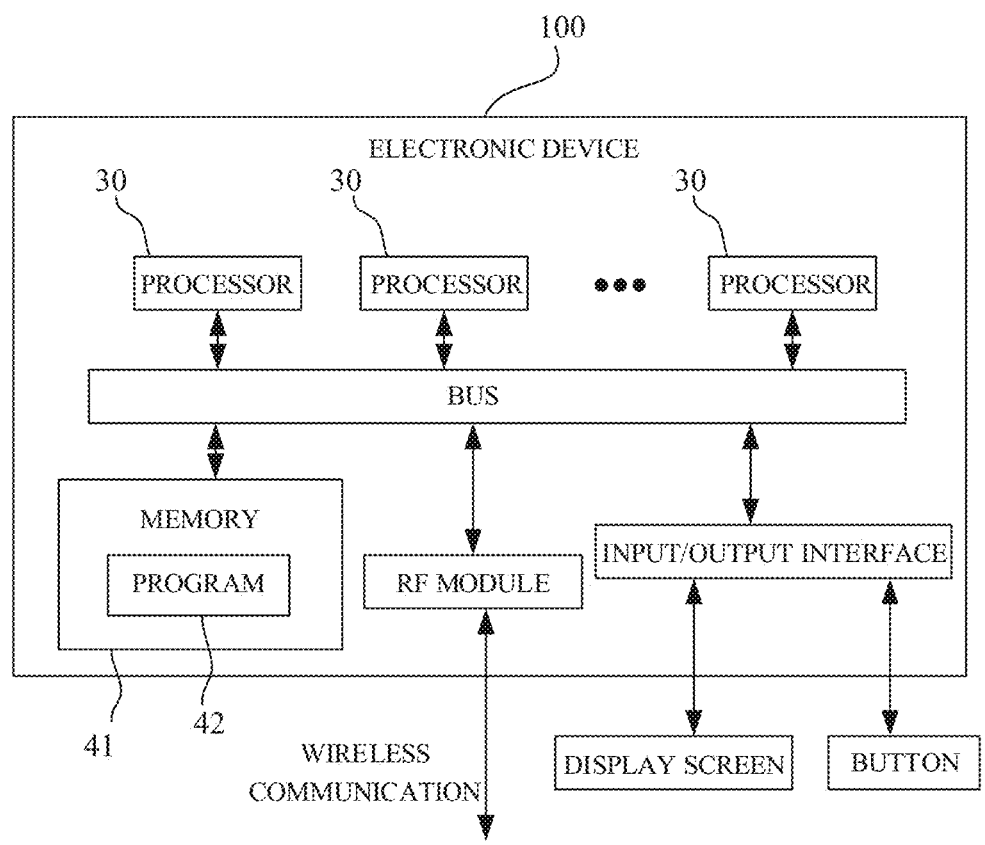
FIG. 14 is a schematic block view of an electronic device provided by exemplary implementations of the present disclosure.

Reference can be made to FIG. 14, and the electronic device 100 provided by the present disclosure includes one or more processors 30, a memory 41, and one or more programs 42, where the one or more programs 42 are stored in the memory 41 and executed by the one or more processors 30, and the one or more programs 42 include instructions for executing the control method by the one or more processors 30.

Figure 15:
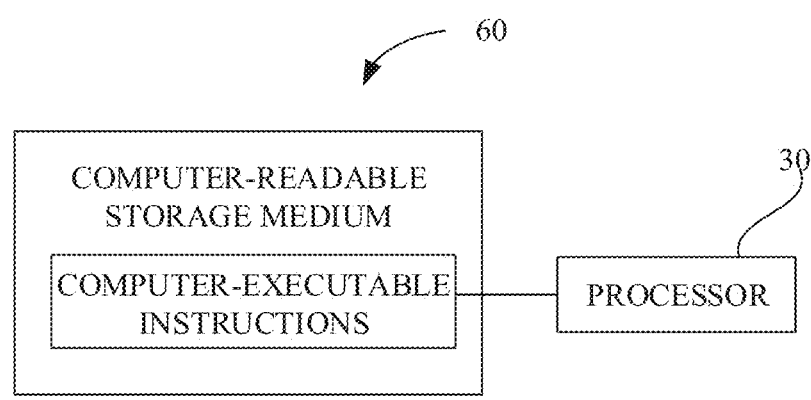
FIG. 15 is a schematic view of coupling between a computer storage medium and a processor provided by exemplary implementations of the present disclosure.

Reference can be made to FIG. 15, one or more non-transitory computer-readable storage mediums 60 are provided in the present disclosure and include computer-executable instructions which, when executed by the one or more processors 30, are operable with the one or more processors 30 to execute the control method.

It can be understood that since the antenna a 310 and the antenna b 320 are disposed on the first side wall 22 and the second side wall 23 respectively, when a user interacts with the electronic device 100, the user usually half-holds the first side wall 22 or the second side wall 23 of the electronic device 100 with a hand, which is easy to cause interference to the antenna a 310 or the antenna b 320 and affect communication of the antenna a 310 or the antenna b 320. Therefore, a processor 30 can compare the communication signal strength of the antenna a 310 and the communication signal strength of the antenna b 320 after the RF transceiver module 110 generates the RF signal, so as to determine whether the RF signal is transmitted by the antenna c 350 and the antenna a 310, or the RF signal is transmitted by the antenna c 350 and the antenna b 320.

Specifically, after the processor 30 controls the RF transceiver module 110 to generate the RF signal, in other words, after the first Tx signal and the second Tx signal are generated, the processor 30 obtains the communication signal strength of the antenna a 310 and the communication signal strength of the antenna b 320, and determines whether the communication signal strength of the antenna a 310 is greater than the communication signal strength of the antenna b 320. If the processor 30 determines that the communication signal strength of the antenna a 310 is greater than the communication signal strength of the antenna b 320, the processor 30 can determine that the antenna b 320 is interfered, such that the processor 30 can control the antenna a 310 to transmit the first Tx signal and control the antenna c 350 to transmit the second Tx signal, or the processor 30 can control the antenna a 310 to transmit the second Tx signal and control the antenna c 350 to transmit the first Tx signal.

Furthermore, in some implementations, the processor 30 can control the second signal control sub-switch 122 and the first signal control sub-switch 121, such that the antenna a 310 and the antenna c 350 transmit the first Tx signal and the second Tx signal respectively, so as to realize communication in a 4G and 5G dual-connectivity mode of the electronic device 100; or the processor 30 can control the second signal control sub-switch 122 and the first signal control sub-switch 121, such that the antenna b 320 and the antenna c 350 transmit the first Tx signal and the second Tx signal respectively, so as to realize communication in a 4G and 5G dual-connectivity mode.

In this way, through arrangement of the first signal control sub-switch 121 and the second signal control sub-switch 122, the RF module can transmit the RF signal through the antenna c 350 and the antenna a 310, or through the antenna c 350 and the antenna b 320, thus effectively avoiding a situation where a signal strength changes greatly since the user holds electronic device 100 tightly.

Figure 16:
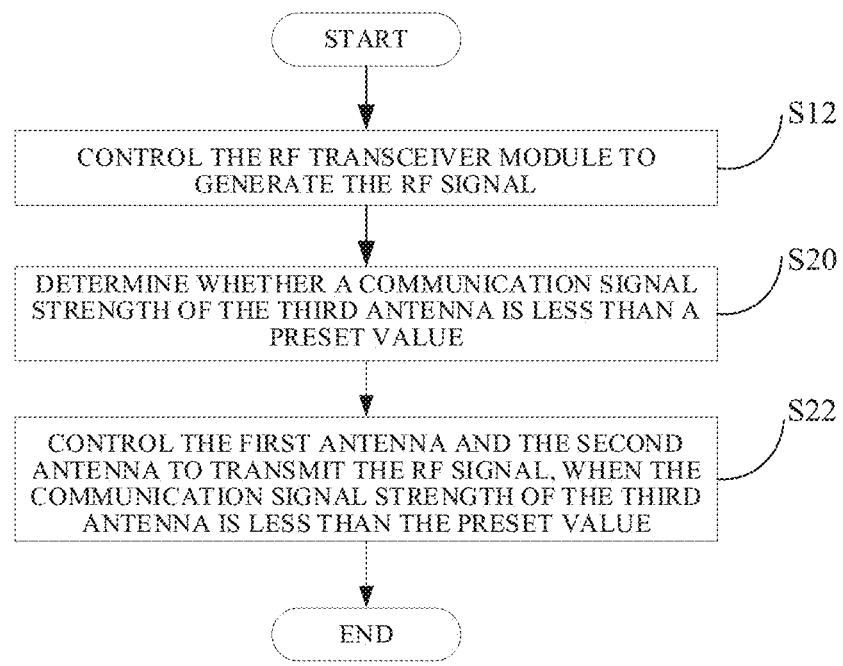
FIG. 16 is a schematic flowchart of a control method provided by other exemplary implementations of the present disclosure.

Reference can be made to FIG. 16, a control method is further provided by the present disclosure, and the control method includes the following operations.

At S12, the RF transceiver module is controlled to generate the RF signal.

At S20, whether a communication signal strength of the antenna c is less than a preset value is determined.

At S22, the antenna a and the antenna b are controlled to transmit the RF signal, when the communication signal strength of the antenna c is less than the preset value.

In some implementations, reference can be further made to FIG. 14, and the processor 30 is configured to determine whether the communication signal strength of the antenna c is less than the preset value. The processor 30 is further configured to control the antenna a and the antenna b to transmit the RF signal, when the communication signal strength of the antenna c is less than the preset value.

It should be noted that the preset value denotes a value which is set beforehand. The preset value can be set by a manufacturer at a factory, or by the user. The preset value can be stored in the computer-readable storage medium 60 and invoked by the processor 30.

It can be understood that in some implementations, communication of the antenna c 350 disposed on the bottom wall 21 may also be blocked. For example, when the user uses the electronic device 100 to play games or watch movies, the communication of the antenna c 350 disposed on the bottom wall 21 is blocked since the bottom wall 21 and a top wall opposite to the bottom wall 21 are held with both hands. Therefore, after the processor 30 controls the RF transceiver module 110 to generate the RF signal, the processor 30 can also determine whether the communication signal strength of the antenna c 350 is less than the preset value. If the communication signal strength of the antenna c 350 is less than the preset value, the communication of the antenna c 350 can be determined to be blocked, and the processor 30 can control the antenna a 310 and the antenna b 320 to transmit the first Tx signal and the second Tx signal, so as to realize communication of the electronic device 100 in a 4G and 5G dual-connectivity mode.

After considering the specification and implementing the invention disclosed herein, other implementations of the present disclosure may readily occur to those skilled in the art. The present disclosure is intended to cover any variations, applications or adaptions of the present disclosure, and these variations, applications or adaptions follow the general principles of the present disclosure and include common sense or conventional technical means in the art not disclosed in the present disclosure. The specification and implementations are merely considered to be exemplary, and the true scope and spirit of the present disclosure are defined by the appended claims.

What is claimed is:

1. A radio frequency (RF) module, comprising:
an RF transceiver module configured for RF signal reception and transmission;
a first antenna configured to transmit a first transmit (Tx) signal and receive a first primary receive (PRx) signal;
a first duplexer, wherein a first end of the first duplexer is coupled with the RF transceiver module, a second end of the first duplexer is coupled with the first antenna, and the first duplexer is configured to isolate the first Tx signal and the first PRx signal;
a second antenna configured to transmit a second Tx signal and receive a second PRx signal, an operating frequency band of the first antenna being different from an operating frequency band of the second antenna;
a second duplexer, wherein a first end of the second duplexer is coupled with the RF transceiver module, a second end of the second duplexer is coupled with the second antenna, and the second duplexer is configured to isolate the second Tx signal and the second PRx signal; and
a third antenna coupled with the RF transceiver module and configured to receive a first diversity receive (DRx) signal and a second DRx signal;
wherein the first antenna is configured to receive the first PRx signal in a fourth-generation (4G) frequency band and transmit the first Tx signal in the 4G frequency band, the second antenna is configured to receive the second PRx signal in a fifth-generation (5G) frequency band and transmit the second Tx signal in the 5G frequency band, the third antenna is configured to receive the first DRx signal in the 4G frequency band and the second DRx signal in the 5G frequency band, and the RF module is configured to realize 4G and 5G dual-connectivity communication in a frequency band B20 and a frequency band n28a.

2. The RF module of claim 1, wherein the first end of the first duplexer comprises a first sub-end and a second sub-end, the first sub-end is coupled with the RF transceiver module to transmit the first Tx signal, and the second sub-end is coupled with the RF transceiver module to transmit the first PRx signal.

3. The RF module of claim 2, further comprising:
a first amplification circuit, wherein a first end of the first amplification circuit is coupled with the RF transceiver module, a second end of the first amplification circuit is coupled with the first sub-end of the first duplexer, and the first amplification circuit is configured to amplify the first Tx signal.

4. The RF module of claim 1, wherein the first end of the second duplexer comprises a first sub-end and a second sub-end, the first sub-end is coupled with the RF transceiver module to transmit the second Tx signal, and the second sub-end is coupled with the RF transceiver module to transmit the second PRx signal.

5. The RF module of claim 4, further comprising:
a second amplification circuit, wherein a first end of the second amplification circuit is coupled with the RF transceiver module, a second end of the second amplification circuit is coupled with the first sub-end of the second duplexer, and the second amplification circuit is configured to amplify the second Tx signal.

6. The RF module of claim 1, further comprising:
a first filter coupled with the third antenna and the RF transceiver module respectively, and configured to filter the first DRx signal and the second DRx signal.

7. The RF module of claim 1, wherein the third antenna is further configured to transmit the first Tx signal and the first antenna is further configured to transmit the second Tx signal.

8. The RF module of claim 1, the RF module being implemented to an electronic device, wherein:
the electronic device comprises a frame;
the frame comprises a bottom wall, a first side wall, and a second side wall opposite to the first side wall; and
the first antenna is disposed on the first side wall and the second antenna is disposed on the second side wall, and the third antenna is disposed on the bottom wall.

9. The RF module of claim 1, wherein the RF transceiver comprises:
a signal control switch coupled with the first duplexer, the second duplexer, and the third antenna respectively, and configured to assign RF signals to two antennas of the first antenna, the second antenna, and the third antenna.

10. A control method, applicable to an electronic device, wherein the electronic device comprises a frame and a radio frequency (RF) module, and the RF module comprises a RF transceiver module, a first antenna, a second antenna, and a third antenna, the method comprising:
- controlling the RF transceiver module to generate an RF signal, wherein the RF transceiver module is configured for RF signal reception and transmission;
- determining whether a communication signal strength of the first antenna is greater than a communication signal strength of the second antenna, wherein the first antenna is configured to transmit a first transmit (Tx) signal and receive a first primary receive (PRx) signal, the second antenna is configured to transmit a second Tx signal and receive a second PRx signal, an operating frequency band of the first antenna is different from an operating frequency band of the second antenna, and the third antenna is configured to receive a first diversity receive (DRx) signal and a second DRx signal and further configured to transmit the first Tx signal or transmit the second Tx signal;
- controlling the first antenna and the third antenna to transmit the RF signal, when the communication signal strength of the first antenna is greater than the communication signal strength of the second antenna, wherein the third antenna is coupled with the RF transceiver module and configured to receive the first DRx signal and the second DRx signal; and
- controlling the second antenna and the third antenna to transmit the RF signal, when the communication signal strength of the first antenna is less than the communication signal strength of the second antenna;
- wherein the first antenna is configured to receive the first PRx signal in a fourth-generation (4G) frequency band and transmit the first Tx signal in the 4G frequency band, the second antenna is configured to receive the second PRx signal in a fifth-generation (5G) frequency band and transmit the second Tx signal in the 5G frequency band, the third antenna is configured to receive the first DRx signal in the 4G frequency band and the second DRx signal in the 5G frequency band, and the RF module is configured to realize 4G and 5G dual-connectivity communication in a frequency band B20 and a frequency band n28a.

11. An electronic device, comprising:
a radio frequency (RF) module, wherein the RF module comprises:
- an RF transceiver module configured for RF signal reception and transmission;
- a first antenna configured to transmit a first transmit (Tx) signal and receive a first primary receive (PRx) signal;
- a first duplexer, wherein a first end of the first duplexer is coupled with the RF transceiver module, a second end of the first duplexer is coupled with the first antenna, and the first duplexer is configured to isolate the first Tx signal and the first PRx signal;
- a second antenna configured to transmit a second Tx signal and receive a second PRx signal, an operating frequency band of the first antenna being different from an operating frequency band of the second antenna;
- a second duplexer, wherein a first end of the second duplexer is coupled with the RF transceiver module, a second end of the second duplexer is coupled with the second antenna, and the second duplexer is configured to isolate the second Tx signal and the second PRx signal; and
- a third antenna coupled with the RF transceiver module and configured to receive a first diversity receive (DRx) signal and a second DRx signal;
- wherein the first antenna is configured to receive the first PRx signal in a fourth-generation (4G) frequency band and transmit the first Tx signal in the 4G frequency band, the second antenna is configured to receive the second PRx signal in a fifth-generation (5G) frequency band and transmit the second Tx signal in the 5G frequency band, the third antenna is configured to receive the first DRx signal in the 4G frequency band and the second DRx signal in the 5G frequency band, and the RF module is configured to realize 4G and 5G dual-connectivity communication in a frequency band B20 and a frequency band n28a.

12. The electronic device of claim 11, further comprising:
- a frame, wherein the RF module is disposed on the frame, and the frame comprises a bottom wall, a first side wall, and a second side wall opposite to the first side wall;
- wherein the third antenna is disposed on the bottom wall, the first antenna is disposed on the first side wall, and the second antenna is disposed on the second side wall;
- wherein the first side wall and the second side wall each are trisected into a bottom region close to the bottom wall, a top region away from the bottom wall, and a middle region between the bottom region and the top region, in a length direction; and
- wherein the first antenna and the second antenna are located in the middle region and the top region, more than half of the first antenna is located in the top region, and more than half of the second antenna is located in the middle region.

13. The electronic device of claim 12, wherein the first antenna is disposed at a part of the first side wall away from the bottom wall and is misaligned with the second antenna, and the third antenna is disposed at a part of the bottom wall close to the first side wall.

* * * * *